(12) United States Patent
Smits

(10) Patent No.: US 10,473,921 B2
(45) Date of Patent: Nov. 12, 2019

(54) SCAN MIRROR SYSTEMS AND METHODS

(71) Applicant: Gerard Dirk Smits, Los Gatos, CA (US)

(72) Inventor: Gerard Dirk Smits, Los Gatos, CA (US)

(*) Notice: Subject to any disclaimer, the term of this patent is extended or adjusted under 35 U.S.C. 154(b) by 0 days.

(21) Appl. No.: 15/976,269

(22) Filed: May 10, 2018

(65) Prior Publication Data
US 2018/0329204 A1 Nov. 15, 2018

Related U.S. Application Data

(60) Provisional application No. 62/602,937, filed on May 10, 2017.

(51) Int. Cl.
G01C 3/08 (2006.01)
G02B 26/10 (2006.01)
G01S 17/06 (2006.01)
G01S 7/481 (2006.01)
G02B 26/08 (2006.01)

(52) U.S. Cl.
CPC .......... *G02B 26/105* (2013.01); *G01S 7/4817* (2013.01); *G01S 17/06* (2013.01); *G02B 26/0816* (2013.01)

(58) Field of Classification Search
CPC . G02B 26/105; G02B 26/0816; G01S 7/4817; G01S 17/06; G01S 17/87; G01S 17/89; G01S 17/936
See application file for complete search history.

(56) References Cited

U.S. PATENT DOCUMENTS

| 4,019,262 A | 4/1977 | Breglia et al. |
| 4,340,274 A | 7/1982 | Spooner |
| 4,820,041 A | 4/1989 | Davidson et al. |

(Continued)

FOREIGN PATENT DOCUMENTS

| DE | 102015205826 A1 | 10/2015 |
| EP | 0722109 A1 | 7/1996 |

(Continued)

OTHER PUBLICATIONS

Office Communication for U.S. Appl. No. 15/694,532 dated Jul. 10, 2018, pp. 1-45.

(Continued)

*Primary Examiner* — Samantha K Abraham
(74) *Attorney, Agent, or Firm* — John W. Branch; Lowe Graham Jones PLLC

(57) ABSTRACT

A system to scan a field of view with light beams can include a scanning mirror arrangement having a mirror and a drive mechanism configured to rotate the mirror about an axis between two terminal positions; at least one light source configured to simultaneously produce at least a first light beam and a second light beam directed at the mirror from different directions. Upon rotation of the mirror, the first and second light beams can scan a field of view.

Another example of a scanning mirror arrangement includes a mirror; hinges attached at opposite sides of the mirror; and a drive mechanism attached to the hinges and configured to twist the hinges resulting in a larger twist to the mirror, wherein the hinges are disposed between the drive mechanism and the mirror.

27 Claims, 12 Drawing Sheets

(56) References Cited

U.S. PATENT DOCUMENTS

| | | | |
|---|---|---|---|
| 4,988,187 A | 1/1991 | Kuriyama |
| 5,052,820 A | 10/1991 | McGinniss et al. |
| 5,107,122 A | 4/1992 | Barkan et al. |
| 5,115,230 A | 5/1992 | Smoot |
| 5,218,427 A | 6/1993 | Koch |
| 5,245,398 A | 9/1993 | Ludden |
| 5,455,568 A | 10/1995 | Lew et al. |
| 5,506,682 A | 4/1996 | Pryor |
| 5,521,722 A | 5/1996 | Colvill et al. |
| 5,559,322 A | 9/1996 | Jacoby et al. |
| 5,572,251 A | 11/1996 | Ogawa |
| 5,580,140 A | 12/1996 | Katz et al. |
| 5,661,506 A | 8/1997 | Lazzouni et al. |
| 5,812,664 A | 9/1998 | Bernobich et al. |
| 5,914,783 A | 6/1999 | Barrus |
| 5,930,378 A | 7/1999 | Kubota et al. |
| 6,115,022 A | 9/2000 | Mayer, III et al. |
| 6,195,446 B1 | 2/2001 | Skoog |
| 6,307,526 B1 | 10/2001 | Mann |
| 6,404,416 B1 | 6/2002 | Kahn et al. |
| 6,535,182 B2 | 3/2003 | Stanton |
| 6,535,275 B2 | 3/2003 | McCaffrey et al. |
| 6,543,899 B2 | 4/2003 | Covannon et al. |
| 6,545,670 B1 | 4/2003 | Pryor |
| 6,670,603 B2 | 12/2003 | Shimada et al. |
| 6,692,994 B2 | 2/2004 | Davis et al. |
| 6,704,000 B2 | 3/2004 | Carpenter |
| 6,710,767 B1 | 3/2004 | Hasegawa et al. |
| 6,766,066 B2 | 7/2004 | Kitazawa |
| 6,843,564 B2 | 1/2005 | Putilin et al. |
| 6,843,568 B2 | 1/2005 | Schenk et al. |
| 6,894,823 B2 | 5/2005 | Taylor et al. |
| 6,982,683 B2 | 1/2006 | Stanton |
| 7,006,142 B2 | 2/2006 | Seo |
| 7,023,536 B2 | 4/2006 | Zhang et al. |
| 7,027,222 B2 | 4/2006 | Takahashi et al. |
| 7,116,455 B2 | 10/2006 | Yamoaka |
| 7,119,965 B1 | 10/2006 | Rolland et al. |
| 7,144,117 B2 | 12/2006 | Kojima |
| 7,182,465 B2 | 2/2007 | Fuchs et al. |
| 7,203,383 B2 | 4/2007 | Fisher |
| 7,232,229 B2 | 6/2007 | Peeters et al. |
| 7,262,765 B2 | 8/2007 | Brown et al. |
| 7,278,745 B2 | 10/2007 | Engle |
| 7,280,211 B2 | 10/2007 | Horibe et al. |
| 7,283,301 B2 | 10/2007 | Peeters et al. |
| 7,289,110 B2 | 10/2007 | Hansson |
| 7,303,289 B2 | 12/2007 | Fujiwara |
| 7,348,528 B2 | 3/2008 | Marshall |
| 7,349,553 B2 | 3/2008 | Rodriguez |
| 7,359,041 B2 | 4/2008 | Xie et al. |
| 7,375,804 B2 | 5/2008 | Liebman et al. |
| 7,377,656 B2 | 5/2008 | Nojima et al. |
| 7,440,691 B2 | 10/2008 | Beniyama et al. |
| 7,511,847 B2 | 3/2009 | Silverbrook et al. |
| 7,554,652 B1 | 7/2009 | Babin et al. |
| 7,667,598 B2 | 2/2010 | Yenisch et al. |
| 7,787,134 B2 | 8/2010 | Kohnen et al. |
| 7,905,567 B2 | 3/2011 | Orsley |
| 7,911,444 B2 | 3/2011 | Yee |
| 8,115,728 B2 | 2/2012 | Feng |
| 8,123,928 B2 | 2/2012 | Cayouette et al. |
| 8,169,447 B2 | 5/2012 | Bhogal et al. |
| 8,170,329 B2 | 5/2012 | Seko et al. |
| 8,189,176 B2 | 5/2012 | Moir |
| 8,259,239 B2 | 9/2012 | Hua |
| 8,282,222 B2 | 10/2012 | Smits |
| 8,297,758 B2 | 10/2012 | Choi et al. |
| 8,330,942 B2 | 12/2012 | Nordenfelt et al. |
| 8,355,117 B2 | 1/2013 | Niclass |
| 8,430,512 B2 | 4/2013 | Smits |
| 8,493,573 B2 | 7/2013 | Chinn et al. |
| 8,558,810 B2 | 10/2013 | Guo |
| 8,573,783 B2 | 11/2013 | Smits |
| 8,665,435 B2 | 3/2014 | Hidaka |
| 8,696,141 B2 | 4/2014 | Smits |
| 8,711,370 B1 | 4/2014 | Smits |
| 8,718,326 B2 | 5/2014 | Yoon et al. |
| 8,773,512 B1 | 7/2014 | Rafii |
| 8,780,161 B2 | 7/2014 | Samadani et al. |
| 8,797,531 B2 | 8/2014 | Knox et al. |
| 8,947,755 B2 | 2/2015 | Konuma et al. |
| 8,953,242 B2 | 2/2015 | Larson et al. |
| 8,957,847 B1 | 2/2015 | Karakotsios et al. |
| 8,994,780 B2 | 3/2015 | Moore |
| 9,026,596 B2 | 5/2015 | Perez et al. |
| 9,131,192 B2 | 9/2015 | Ubillos et al. |
| 9,134,799 B2 | 9/2015 | Mark |
| 9,151,607 B2 | 10/2015 | Davies et al. |
| 9,244,339 B2 | 1/2016 | Wang |
| 9,323,055 B2 | 4/2016 | Baillot |
| 9,366,519 B2 | 6/2016 | Danbury et al. |
| 9,377,533 B2 | 6/2016 | Smits |
| 9,454,014 B2 | 9/2016 | Kurashige et al. |
| 9,562,764 B2 | 2/2017 | France |
| 9,599,713 B2 | 3/2017 | Giger et al. |
| 9,618,610 B2 | 4/2017 | Kao et al. |
| 9,813,673 B2 | 11/2017 | Smits |
| 9,842,514 B2 | 12/2017 | Hoelzer et al. |
| 9,854,196 B2 | 12/2017 | Liu et al. |
| 9,864,440 B2 | 1/2018 | Geller et al. |
| 9,939,233 B2 | 4/2018 | Scott et al. |
| 9,946,076 B2 | 4/2018 | Smits et al. |
| 9,952,033 B2 | 4/2018 | Martini et al. |
| 9,961,337 B2 | 5/2018 | Stroetmann |
| 10,037,017 B2 | 7/2018 | Wooldridge et al. |
| 10,067,230 B2 | 9/2018 | Smits |
| 2001/0043165 A1 | 11/2001 | Stanton |
| 2002/0011987 A1 | 1/2002 | Kitazawa |
| 2002/0036765 A1 | 3/2002 | McCaffrey et al. |
| 2002/0039138 A1 | 4/2002 | Edelson et al. |
| 2002/0040971 A1 | 4/2002 | Ono |
| 2002/0067466 A1 | 6/2002 | Covannon et al. |
| 2002/0089489 A1 | 7/2002 | Carpenter |
| 2002/0100884 A1 | 8/2002 | Maddock |
| 2002/0145588 A1 | 10/2002 | McCahon et al. |
| 2002/0149694 A1 | 10/2002 | Seo |
| 2003/0010888 A1 | 1/2003 | Shimada et al. |
| 2003/0045034 A1 | 3/2003 | Davis et al. |
| 2003/0156260 A1 | 8/2003 | Putilin et al. |
| 2003/0202234 A1 | 10/2003 | Taylor et al. |
| 2003/0202679 A1 | 10/2003 | Rodriguez |
| 2003/0214710 A1 | 11/2003 | Takahashi et al. |
| 2003/0222649 A1 | 12/2003 | Starkweather |
| 2004/0006424 A1 | 1/2004 | Joyce et al. |
| 2004/0054359 A1 | 3/2004 | Ruiz et al. |
| 2004/0100508 A1 | 5/2004 | Hansson |
| 2004/0114834 A1 | 6/2004 | Fisher |
| 2004/0218155 A1 | 11/2004 | Schenk et al. |
| 2004/0263874 A1 | 12/2004 | Silverbrook et al. |
| 2005/0030305 A1 | 2/2005 | Brown et al. |
| 2005/0035943 A1 | 2/2005 | Kojima |
| 2005/0052635 A1 | 3/2005 | Xie et al. |
| 2005/0083248 A1 | 4/2005 | Biocca et al. |
| 2005/0099664 A1 | 5/2005 | Yamaoka |
| 2005/0159893 A1 | 7/2005 | Isaji et al. |
| 2005/0195375 A1 | 9/2005 | Fujiwara |
| 2005/0195387 A1 | 9/2005 | Zhang et al. |
| 2005/0219530 A1 | 10/2005 | Horibe et al. |
| 2005/0254726 A1 | 11/2005 | Fuchs et al. |
| 2005/0273830 A1 | 12/2005 | Silver et al. |
| 2006/0028374 A1 | 2/2006 | Fullerton |
| 2006/0028622 A1 | 2/2006 | Nojima et al. |
| 2006/0132447 A1 | 6/2006 | Conrad |
| 2006/0132472 A1 | 6/2006 | Peeters et al. |
| 2006/0132729 A1 | 6/2006 | Engle |
| 2006/0197936 A1 | 9/2006 | Liebman |
| 2006/0256133 A1 | 11/2006 | Rosenberg |
| 2007/0046625 A1 | 3/2007 | Yee |
| 2007/0053679 A1 | 3/2007 | Beniyama et al. |
| 2007/0064242 A1 | 3/2007 | Childers |
| 2007/0103699 A1 | 5/2007 | Kohnen et al. |
| 2007/0138371 A1 | 6/2007 | Marshall |
| 2007/0182949 A1 | 8/2007 | Niclass |

(56) References Cited

U.S. PATENT DOCUMENTS

| | | |
|---|---|---|
| 2007/0273610 A1 | 11/2007 | Baillot |
| 2008/0018591 A1 | 1/2008 | Pittel et al. |
| 2008/0266169 A1 | 10/2008 | Akita |
| 2008/0291213 A1 | 11/2008 | Bhogal |
| 2008/0316026 A1 | 12/2008 | Yenisch et al. |
| 2008/0317077 A1 | 12/2008 | Hoving et al. |
| 2009/0096994 A1 | 4/2009 | Smits |
| 2009/0147239 A1 | 6/2009 | Zhu et al. |
| 2009/0285590 A1 | 11/2009 | Orsley |
| 2010/0002154 A1 | 1/2010 | Hua |
| 2010/0008588 A1 | 1/2010 | Feldkhun et al. |
| 2010/0014750 A1 | 1/2010 | Seko et al. |
| 2010/0045967 A1 | 2/2010 | Moir |
| 2010/0110385 A1 | 5/2010 | Choi et al. |
| 2010/0142856 A1 | 6/2010 | Takeuchi et al. |
| 2010/0149518 A1 | 6/2010 | Nordenfelt et al. |
| 2011/0001793 A1 | 1/2011 | Moriyama et al. |
| 2011/0123113 A1 | 5/2011 | Berretty et al. |
| 2011/0211243 A1 | 9/2011 | Smits |
| 2011/0249157 A1 | 10/2011 | Fredembach et al. |
| 2011/0304842 A1 | 12/2011 | Kao et al. |
| 2012/0017147 A1 | 1/2012 | Mark |
| 2012/0050528 A1 | 3/2012 | Davies et al. |
| 2012/0132713 A1 | 5/2012 | Chaum |
| 2012/0134537 A1 | 5/2012 | Yoon et al. |
| 2012/0140231 A1 | 6/2012 | Knox et al. |
| 2012/0187296 A1 | 7/2012 | Hollander et al. |
| 2012/0224019 A1 | 9/2012 | Samadani et al. |
| 2012/0229818 A1 | 9/2012 | Chinn et al. |
| 2012/0250152 A1 | 10/2012 | Larson et al. |
| 2012/0274937 A1 | 11/2012 | Hays et al. |
| 2012/0320013 A1 | 12/2012 | Perez et al. |
| 2013/0003081 A1 | 1/2013 | Smits |
| 2013/0021271 A1 | 1/2013 | Guo |
| 2013/0079983 A1 | 3/2013 | Ehilgen et al. |
| 2013/0088465 A1 | 4/2013 | Geller et al. |
| 2013/0170006 A1 | 7/2013 | Kurashige et al. |
| 2013/0176561 A1 | 7/2013 | Hidaka |
| 2013/0215487 A1 | 9/2013 | Konuma et al. |
| 2013/0229669 A1 | 9/2013 | Smits |
| 2013/0239057 A1 | 9/2013 | Ubillos et al. |
| 2013/0300637 A1 | 11/2013 | Smits et al. |
| 2013/0300670 A1 | 11/2013 | Besperstov et al. |
| 2013/0342813 A1 | 12/2013 | Wang |
| 2014/0022539 A1 | 1/2014 | France |
| 2014/0098179 A1 | 4/2014 | Moore |
| 2014/0146243 A1 | 5/2014 | Liu et al. |
| 2014/0176954 A1 | 6/2014 | Scott et al. |
| 2014/0215841 A1 | 8/2014 | Danbury et al. |
| 2014/0267620 A1 | 9/2014 | Bridges |
| 2014/0273752 A1 | 9/2014 | Bajaj et al. |
| 2014/0285818 A1 | 9/2014 | Holz |
| 2014/0307248 A1 | 10/2014 | Giger et al. |
| 2015/0009493 A1 | 1/2015 | Kwiatkowski et al. |
| 2015/0066196 A1 | 3/2015 | Wooldridge et al. |
| 2015/0091815 A1 | 4/2015 | Michaelis |
| 2015/0225783 A1 | 8/2015 | Mears et al. |
| 2015/0233703 A1 | 8/2015 | Martini et al. |
| 2015/0279114 A1 | 10/2015 | Yonekubo |
| 2015/0285625 A1 | 10/2015 | Deane |
| 2015/0286293 A1 | 10/2015 | Gruhlke et al. |
| 2016/0011312 A1 | 1/2016 | Leyva |
| 2016/0014403 A1 | 1/2016 | Stroetmann |
| 2016/0041266 A1* | 2/2016 | Smits .................. G01S 17/66 356/5.01 |
| 2016/0050345 A1 | 2/2016 | Longbotham et al. |
| 2016/0306044 A1 | 10/2016 | Smits |
| 2016/0335778 A1 | 11/2016 | Smits |
| 2017/0131090 A1 | 5/2017 | Bronstein et al. |
| 2017/0208292 A1 | 7/2017 | Smits |
| 2018/0039852 A1 | 2/2018 | Nakamura et al. |
| 2019/0080612 A1 | 3/2019 | Weissman et al. |

FOREIGN PATENT DOCUMENTS

| | | |
|---|---|---|
| JP | 11119184 A | 4/1999 |
| JP | 2001045381 A | 2/2001 |
| JP | 2003029201 A | 1/2003 |
| JP | 2004132914 A | 4/2004 |
| JP | 2005519338 A | 6/2005 |
| JP | 2011197674 A | 10/2011 |
| JP | 2013097138 A | 5/2013 |
| KR | 10-2011-0115752 A | 10/2011 |
| KR | 101665938 B1 | 10/2016 |
| WO | 1992/8971 A1 | 10/1992 |
| WO | 2000/034818 A1 | 6/2000 |
| WO | 2006/063577 A1 | 6/2006 |
| WO | 2009/049272 A2 | 4/2009 |
| WO | 2011/109402 A2 | 9/2011 |
| WO | 2012/054231 A2 | 4/2012 |
| WO | 2014141115 A2 | 9/2014 |
| WO | 2016033036 A2 | 3/2016 |

OTHER PUBLICATIONS

Office Communication for U.S. Appl. No. 15/804,392 dated Jun. 6, 2018, pp. 1-6.

Office Communication for U.S. Appl. No. 15/194,502 dated Jun. 11, 2018, pp. 1-13.

Office Communication for U.S. Appl. No. 15/804,909 dated Jul. 5, 2018, pp. 1-12.

Office Communication for U.S. Appl. No. 15/799,149 dated Jun. 20, 2018, pp. 1-7.

Office Communication for U.S. Appl. No. 15/853,783 dated Aug. 15, 2018, pp. 1-49.

International Search Report and Written Opinion for International Patent Application No. PCT/US2017/059282 dated Aug. 10, 2018, pp. 1-10.

Office Communication for U.S. Appl. No. 15/444,182 dated Sep. 13, 2018, pp. 1-11.

Office Communication for U.S. Appl. No. 16/049,380 dated Sep. 27, 2018, pp. 1-40.

Office Communication for U.S. Appl. No. 16/140,485 dated Nov. 23, 2018, pp. 1-58.

International Search Report and Written Opinion in International Patent Application No. PCT/US18/32078 dated Nov. 16, 2018; pp. 1-16.

Office Communication for U.S. Appl. No. 15/194,502 dated Jan. 3, 2019, pp. 1-15.

Office Communication for U.S. Appl. No. 15/694,532 dated Jan. 17, 2019, pp. 1-9.

Office Communication for U.S. Appl. No. 15/853,783 dated Jan. 24, 2019, pp. 1-36.

International Search Report and Written Opinion for International Application No. PCT/US2017/014616 dated May 1, 2017, 11 pages.

Official Communication for U.S. Appl. No. 15/384,227 dated Feb. 7, 2017, 8 pages.

Official Communication for U.S. Appl. No. 15/384,227 dated Jul. 19, 2017, 5 pages.

Official Communication for U.S. Appl. No. 14/671,904 dated Aug. 18, 2017, 7 pages.

Official Communication for U.S. Appl. No. 15/194,502 dated Aug. 15, 2017, 7 pages.

Official Communication for U.S. Appl. No. 15/411,959 dated Aug. 29, 2017, 5 pages.

Official Communication for U.S. Appl. No. 13/877,652 dated Dec. 6, 2017, 8 pages.

Official Communication for U.S. Appl. No. 15/799,149 dated Jan. 10, 2018, 7 pages.

Official Communication for U.S. Appl. No. 15/444,182 dated Feb. 14, 2018, 8 pages.

Official Communication for U.S. Appl. No. 15/194,502 dated Feb. 12, 2018, 9 pages.

Official Communication for U.S. Appl. No. 15/804,392 dated Feb. 9, 2018, 10 pages.

(56) References Cited

OTHER PUBLICATIONS

Official Communication for U.S. Appl. No. 15/804,909 dated Feb. 12, 2018, 14 pages.
Official Communication for U.S. Appl. No. 15/098,285 dated Apr. 19, 2018, 69 pages.
International Search Report and Written Opinion for International Patent Application No. PCT/US2017/068377 dated Apr. 17, 2018, 12 pages.
Office Communication for U.S. Appl. No. 15/411,959 dated May 11, 2017, 8 pages.
Savage, P., "GDC 2013: Valv's Michael Abrash on the challenges of VR—'a new world is emerging'," PCGamer, Apr. 2, 2013, 6 pages.
European Search Report for European Patent Application No. 08837063.0 dated Nov. 19, 2010, 8 pages.
Communication Pursuant to Article 94(3) EPC in European Patent Application No. 08837063.0 dated Dec. 27, 2011, 5 pages.
Communication Pursuant to Article 94(3) EPC in European Patent Application No. 08837063.0 dated Oct. 22, 2012, 6 pages.
International Search Report and Written Opinion in International Patent Application No. PCT/US2008/079663 dated Apr. 30, 2009, 5 pages.
International Search Report and Written Opinion in International Patent Application No. PCT/US2011/026691 dated Oct. 24, 2011, 7 pages.
International Search Report in International Patent Application No. PCT/US2011/054751 dated Jan. 30, 2012, 1 page.
International Preliminary Report on Patentability in International Patent Application No. PCT/US2008/079663 dated Jan. 25, 2010, 11 pages.
International Preliminary Report on Patentability issued in PCT/US2011/026691 dated Sep. 4, 2012, 7 pages.
International Preliminary Report on Patentability issued in PCT/US2011/054751 dated Apr. 9, 2013, 7 pages.
Official Communication for U.S. Appl. No. 12/249,899 dated Sep. 14, 2011, 11 pages.
Official Communication for U.S. Appl. No. 12/249,899 dated Mar. 13, 2012, 12 pages.
Official Communication for U.S. Appl. No. 12/249,899 dated Jun. 6, 2012, 12 pages.
Official Communication for U.S. Appl. No. 13/037,949 dated Nov. 2, 2012, 12 pages.
Official Communication for U.S. Appl. No. 13/037,949 dated Aug. 26, 2013, 9 pages.
Official Communication for U.S. Appl. No. 13/605,948 dated Dec. 31, 2012, 10 pages.
Official Communication for U.S. Appl. No. 13/858,762 dated Sep. 13, 2013, 16 pages.
Official Communication for U.S. Appl. No. 13/877,652 dated Mar. 12, 2015, 20 pages.
Official Communication for U.S. Appl. No. 14/046,374 dated Feb. 20, 2014, 10 pages.
European Supplementary Search Report for European Patent Application No. 11834848.1 dated Feb. 21, 2014, 7 pages.
Official Communication for U.S. Appl. No. 13/858,762 dated Jan. 31, 2014, 15 pages.
Official Communication for U.S. Appl. No. 14/048,954 dated Feb. 26, 2014, 24 pages.
Official Communication for U.S. Appl. No. 14/048,954 dated Oct. 22, 2014, 8 pages.
International Search Report and Written Opinion for application PCT/US2015/023184 dated Jun. 29, 2015, 13 pages.
Official Communication for U.S. Appl. No. 13/877,652 dated Aug. 18, 2015, 21 pages.
Official Communication for U.S. Appl. No. 14/636,062 dated Sep. 25, 2015, 8 pages.
Official Communication for U.S. Appl. No. 14/671,904 dated Sep. 22, 2015, 15 pages.
Official Communication for U.S. Appl. No. 14/636,062 dated Jun. 2, 2015, 7 pages.
International Search Report and Written Opinion for PCT/US2015/044691 dated Nov. 18, 2015, 12 pages.
Official Communication for U.S. Appl. No. 14/823,668 dated Oct. 30, 2015, 12 pages.
Official Communication for U.S. Appl. No. 14/636,062 dated Dec. 14, 2015, 3 pages.
Official Communication for U.S. Appl. No. 14/823,668 dated Feb. 24, 2016, 15 pages.
Official Communication for U.S. Appl. No. 14/671,904 dated Feb. 22, 2016, 13 pages.
Official Communication for U.S. Appl. No. 13/877,652 dated Feb. 10, 2016, 22 pages.
Official Communication for U.S. Appl. No. 14/636,062 dated Feb. 1, 2016, 9 pages.
O'Toole, M., et al., Homogeneous Codes for Energy-Efficient Illumination and Imaging. ACM Transactions on Graphics, 34(4), 35:1-35:13.
Official Communication for U.S. Appl. No. 14/823,668 dated May 18, 2016, 10 pages.
Official Communication for U.S. Appl. No. 14/218,643 dated Jun. 23, 2016, 11 pages.
Official Communication for U.S. Appl. No. 13/877,652 dated Aug. 12, 2016, 22 pages.
Official Communication for U.S. Appl. No. 15/194,502 dated Aug. 19, 2016, 12 pages.
Official Communication for U.S. Appl. No. 14/636,062 dated Aug. 24, 2016, 9 pages.
International Search Report and Written Opinion for Application PCT/US2016/027386 dated Aug. 26, 2016, 10 pages.
Official Communication for U.S. Appl. No. 14/671,904 dated Sep. 28, 2016, 14 pages.
Official Communication for U.S. Appl. No. 14/218,643 dated Nov. 1, 2016, 10 pages.
Kanzawa, Y., et al., "Human Skin Detection by Visible and Near-Infrared Imaging," IAPR Conference on Machine Vision Applications, Jun. 13-15, 2011, Nara Japan, 5 pages.
Office Communication for U.S. Appl. No. 13/877,652 dated May 31, 2017, 23 pages.
Office Communication for U.S. Appl. No. 15/194,502 dated Mar. 9, 2017, 7 pages.
International Search Report and Written Opinion for International Application No. PCT/US2016/067626 dated Mar. 16, 2017, 12 pages.
Office Communication for U.S. Appl. No. 14/671,904 dated May 5, 2017, 11 pages.
Office Communication for U.S. Appl. No. 15/411,959 dated May 11, 2017, 9 pages.
Office Communication for U.S. Appl. No. 16/165,631 dated Apr. 1, 2019, pp. 1-23.
Office Communication for U.S. Appl. No. 16/114,139 dated Apr. 19, 2019, pp. 1-50.
Office Communication for U.S. Appl. No. 15/444,182 dated Mar. 20, 2019, pp. 1-10.
Office Communication for U.S. Appl. No. 15/194,502 dated Mar. 6, 2019, pp. 1-11.
Office Communication for U.S. Appl. No. 16/223,043 dated Mar. 14, 2019, pp. 1-46.
European Supplementary Search Report for European Patent Application No. 16876940.4 dated May 8, 2019, pp. 1-8.

* cited by examiner

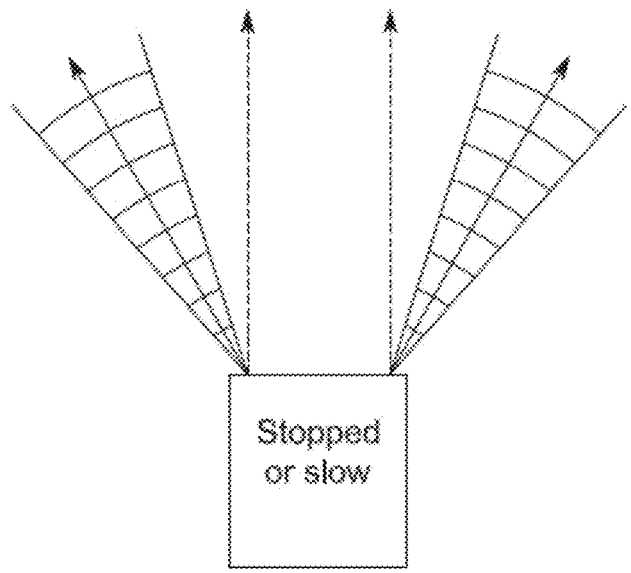
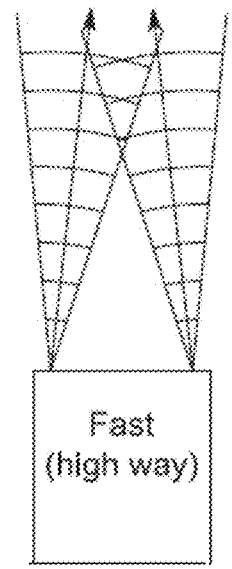
FIG. 14A  FIG. 14B
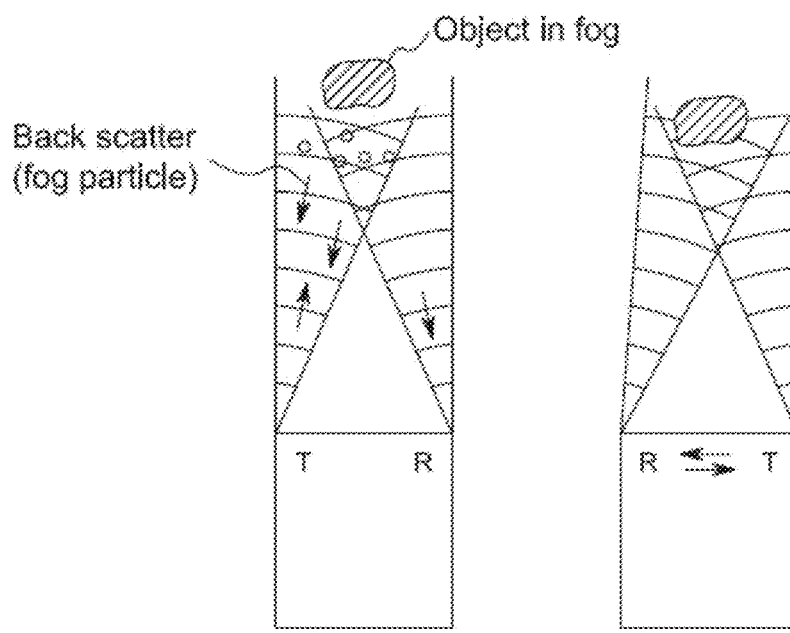
FIG. 14C

SCAN MIRROR SYSTEMS AND METHODS

CROSS-REFERENCE TO RELATED APPLICATION

This application is a Utility patent application based on previously filed U.S. Provisional Patent Application U.S. Ser. No. 62/602,937 filed on May 10, 2017, the benefit of the filing date of which is hereby claimed under 35 U.S.C. § 119(e) and which is further incorporated in entirety by reference.

TECHNICAL FIELD

The present invention relates generally to scanning mirror systems and arrangements and to methods of making and using the scanning mirror systems and arrangements. The present invention is also directed to systems and methods for scanning a field of view with light beams or determining a position of objects within a field of view.

BACKGROUND

Scanning mirrors can be used in a variety of applications. There are several mirror design parameters that can be challenging to manage or optimize. A high line resonance frequency keeps the resonant mirror small and with a relative low resonant mass. A wide scan field (for a wide field of view (FoV)) is often desirable, but due to the inherent dynamics of a conventional resonant MEMS mirror design, this typically results in slower scan speeds. A mirror surface with high quality optical characteristics is desirable for achieving good beam quality. Uniform illumination scan coverage is desirable in many systems. These four design parameters are often in starkly opposite directions, and in many conventional designs, significant trade-offs are made between the design parameters which may limit system performance parameters such a resolution, range, and voxel acquisition rate.

BRIEF DESCRIPTION OF THE DRAWINGS

FIGS. 14A to 14C illustrate an embodiment of a vehicle with a dual head light assembly during different modes of operation.

DETAILED DESCRIPTION OF THE INVENTION

Figure 1:
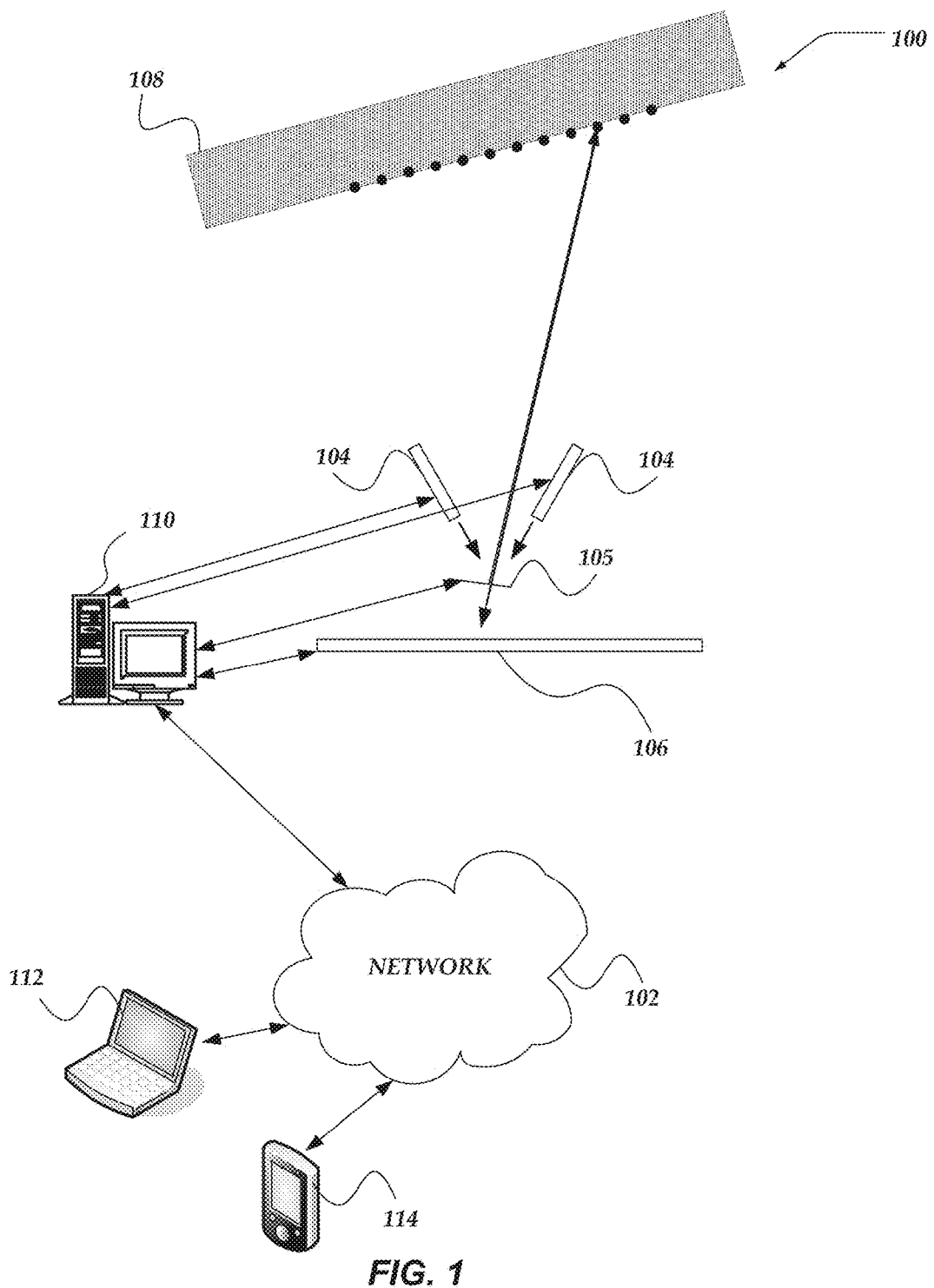
FIG. 1 shows an embodiment of an exemplary environment in which various embodiments of the invention may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "photon beam," "light beam," "electromagnetic beam," "image beam," or "beam" refer to a somewhat localized (in time and space) beam or bundle of photons or electromagnetic (EM) waves of various frequencies or wavelengths within the EM spectrum. An outgoing light beam is a beam that is transmitted by various ones of the various embodiments disclosed herein. An incoming light beam is a beam that is detected by various ones of the various embodiments disclosed herein.

As used herein, the terms "light source," "photon source," or "source" refer to various devices that are capable of emitting, providing, transmitting, or generating one or more photons or EM waves of one or more wavelengths or frequencies within the EM spectrum. A light or photon source may transmit one or more outgoing light beams. A photon source may be a laser, a light emitting diode (LED), an organic light emitting diode (OLED), a light bulb, or the like. A photon source may generate photons via stimulated emissions of atoms or molecules, an incandescent process, or various other mechanism that generates an EM wave or one or more photons. A photon source may provide continuous or pulsed outgoing light beams of a predetermined frequency, or range of frequencies. The outgoing light beams may be coherent light beams. The photons emitted by a light source may be of various wavelengths or frequencies.

As used herein, the terms "receiver," "photon receiver," "photon detector," "light detector," "detector," "photon sensor," "light sensor," or "sensor" refer to various devices that are sensitive to the presence of one or more photons of one or more wavelengths or frequencies of the EM spectrum. A photon detector may include an array of photon detectors, such as an arrangement of a plurality of photon detecting or sensing pixels. One or more of the pixels may be a photosensor that is sensitive to the absorption of one or more photons. A photon detector may generate a signal in response to the absorption of one or more photons. A photon detector may include a one-dimensional (1D) array of pixels. However, in other embodiments, photon detector may include at least a two-dimensional (2D) array of pixels. The pixels may include various photon-sensitive technologies, such as one or more of active-pixel sensors (APS), charge-coupled devices (CCDs), Single Photon Avalanche Detector (SPAD) (operated in avalanche mode or Geiger mode), complementary metal-oxide-semiconductor (CMOS) devices, silicon photomultipliers (SiPM), photovoltaic cells, phototransistors, twitchy pixels, or the like. A photon detector may detect one or more incoming light beams.

As used herein, the term "target" is one or more various 2D or 3D bodies that reflect or scatter at least a portion of incident light, EM waves, or photons. The target may also be referred to as an "object." For instance, a target or object may scatter or reflect an outgoing light beam that is transmitted by various ones of the various embodiments disclosed herein. In the various embodiments described herein, one or more light sources may be in relative motion to one or more of receivers and/or one or more targets or objects. Similarly, one or more receivers may be in relative motion to one or more of light sources and/or one or more targets or objects. One or more targets or objects may be in relative motion to one or more of light sources and/or one or more receivers.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to a scanning mirror arrangement to scan a field of view with light beams. The arrangement can include a scanning mirror arrangement having a mirror and a drive mechanism configured to rotate the mirror about an axis between two terminal positions; at least one light source configured to simultaneously produce at least a first light beam and a second light beam directed at the mirror from different directions. Upon rotation of the mirror, the first and second light beams can scan a field of view.

Another example of a scanning mirror arrangement includes a mirror; hinges attached at opposite sides of the mirror; and a drive mechanism attached to the hinges and configured to twist the hinges resulting in a larger twist to the mirror, wherein the hinges are disposed between the drive mechanism and the mirror.

Illustrated Operating Environment

FIG. 1 shows exemplary components of one embodiment of an exemplary environment in which various exemplary embodiments of the invention may be practiced. Not all of the components may be required to practice the invention, and variations in the arrangement and type of the components may be made without departing from the spirit or scope of the invention.

A scanning mirror 105 can rotate or otherwise move to scan light received from a light source over a field of view. The scanning mirror 105 may be any suitable scanning mirror including, but not limited to, a MEMS scanning mirror, acousto-optical, electro-optical scanning mirrors, or fast phased arrays, such as 1D ribbon MEMS arrays or Optical Phased Arrays (OPA). Scanning mirror 105 may also include an optical system that includes optical components to direct or focus the incoming or outgoing light beams. The optical systems may aim and shape the spatial and temporal beam profiles of incoming or outgoing light beams. The optical system may collimate, fan-out, or otherwise manipulate the incoming or outgoing light beams. Scanning mirror 105 may include various ones of the features, components, or functionality of a computer device, including but not limited to mobile computer 200 of FIG. 2 and/or network computer 300 of FIG. 3.

FIG. 1 illustrates one embodiment of a system 100 that includes the scanning mirror 105. It will be understood that the scanning mirror can be used in a variety of other systems including, but not limited to, scanning laser vision, motion tracking LIDAR, illumination, and imaging type display systems for AR and VR, such as described in U.S. Pat. Nos. 8,282,222; 8,430,512, 8,573,783; 8,696,141; 8,711,370, 8,971,568; 9,377,553; 9,501,175; 9,581,883; 9,753,126; 9,810,913; 9,813,673; 9,946,076; U.S. Patent Application Publication Nos. 2013/0300637 and 2016/0041266; U.S. Provisional Patent Application Ser. Nos. 62/498,534; 62/606,879; 62/707,194; and 62/709,715 and U.S. patent application Ser. No. 15/853,783. Each of these U.S. patents and U.S. patent applications publications listed above are herein incorporated by reference in the entirety.

The system 100 of FIG. 1 also includes network 102, one or more light sources 104, receiver 106, one or more objects or targets 108, and a system computer device 110. In some embodiments, system 100 may include one or more other computers, such as but not limited to laptop computer 112 and/or mobile computer, such as but not limited to a smartphone or tablet 114. In some embodiments, light source 104 and/or receiver 106 may include one or more components included in a computer, such as but not limited to various ones of computers 110, 112, or 114. The one or more light sources 104, scanning mirror 105, and receiver 106 can be coupled directly to the computer 110, 112, or 114 by any wireless or wired technique or may be coupled to the computer 110, 112, or 114 through a network 102.

System 100, as well as other systems discussed herein, may be a sequential-pixel photon projection system. In one or more embodiment system 100 is a sequential-pixel laser projection system that includes visible and/or non-visible photon sources. Various embodiments of such systems are described in detail in at least U.S. Pat. Nos. 8,282,222; 8,430,512; 8,573,783; 8,696,141; 8,711,370; 9,377,553; 9,753,126; 9,946,076; U.S. Patent Application Publication Nos. 2013/0300637 and 2016/0041266; U.S. Provisional Patent Application Ser. Nos. 62/498,534 and 62/606,879; and U.S. patent application Ser. No. 15/853,783, each of which is herein incorporated by reference in the entirety.

Light sources 104 may include one or more light sources for transmitting light or photon beams. Examples of suitable light sources includes lasers, laser diodes, light emitting diodes, organic light emitting diodes, or the like. For instance, light source 104 may include one or more visible and/or non-visible laser sources. In at least some embodiments, light source 104 includes one or more of a red (R), a green (G), or a blue (B) laser source. In at least some embodiment, light source includes one or more non-visible laser sources, such as a near-infrared (NIR) or infrared (IR) laser. A light source may provide continuous or pulsed light beams of a predetermined frequency, or range of frequencies. The provided light beams may be coherent light beams. Light source 104 may include various ones of the features, components, or functionality of a computer device, including but not limited to mobile computer 200 of FIG. 2 and/or network computer 300 of FIG. 3. In at least some embodiments, there are two or more light beams directed at the scanning mirror 105. The light beams can be from different light sources 104, as illustrated in FIG. 1, or from the same light source 104 where the beam from the light source has been split into two different beams using, for example, a beam splitting arrangement. For example, a beamsplitting arrangement can include a beamsplitter and one or more mirrors or other optical elements to redirect at least one of the light beams. As another example, a reflective polarizer can split the beam into two parts with mirrors or other optical elements to redirect at least one of the light beams.

Light source 104 may also include an optical system that includes optical components to direct or focus the transmitted or outgoing light beams. The optical systems may aim and shape the spatial and temporal beam profiles of outgoing light beams. The optical system may collimate, fan-out, or otherwise manipulate the outgoing light beams. At least a portion of the outgoing light beams are aimed at the scanning mirror 105 which aims the light beam at the object 108.

Receiver 106 can be any suitable light receiver including, but not limited to, one or more photon-sensitive, or photon-detecting, arrays of sensor pixels. An array of sensor pixels detects continuous or pulsed light beams reflected from target 108. The array of pixels may be a one dimensional-array or a two-dimensional array. The pixels may include SPAD pixels or other photo-sensitive elements that avalanche upon the illumination one or a few incoming photons. The pixels may have ultra-fast response times in detecting a single or a few photons that are on the order of a few nanoseconds. The pixels may be sensitive to the frequencies emitted or transmitted by light source 104 and relatively insensitive to other frequencies. Receiver 106 also includes an optical system that includes optical components to direct and focus the received beams, across the array of pixels. Receiver 106 may include various ones of the features, components, or functionality of a computer device, including but not limited to mobile computer 200 of FIG. 2 and/or network computer 300 of FIG. 3.

Various embodiment of computer device 110 are described in more detail below in conjunction with FIGS. 2-3 (e.g., computer device 110 may be an embodiment of mobile computer 200 of FIG. 2 and/or network computer 300 of FIG. 3). Briefly, however, computer device 110 includes virtually various computer devices enabled to operate a scanning mirror arrangement or to perform the various position determination processes and/or methods discussed herein, based on the detection of photons reflected from one or more surfaces, including but not limited to surfaces of object or target 108. Based on the detected photons or light beams, computer device 110 may alter or otherwise modify one or more configurations of light source 104 and receiver 106. It should be understood that the functionality of computer device 110 may be performed by light source 104, scanning mirror 105, receiver 106, or a combination thereof, without communicating to a separate device.

In some embodiments, at least some of the scanning mirror operation or position determination functionality may be performed by other computers, including but not limited to laptop computer 112 and/or a mobile computer, such as but not limited to a smartphone or tablet 114. Various embodiments of such computers are described in more detail below in conjunction with mobile computer 200 of FIG. 2 and/or network computer 300 of FIG. 3.

Network 102 may be configured to couple network computers with other computing devices, including light source 104, photon receiver 106, tracking computer device 110, laptop computer 112, or smartphone/tablet 114. Network 102 may include various wired and/or wireless technologies for communicating with a remote device, such as, but not limited to, USB cable, Bluetooth®, Wi-Fi®, or the like. In some embodiments, network 102 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 102 may be enabled to employ various forms of communication technology, topology, computer-readable media, or the like, for communicating information from one electronic device to another. For example, network 102 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 102 may include various communication technologies by which information may travel between computing devices.

Network 102 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer (e.g., laptop computer 112 or smart phone or tablet computer 114) (or other mobile devices). Such sub-networks may include mesh networks, Wireless LAN (WLAN) networks, cellular networks, or the like. In one or more of the various embodiments, the system may include more than one wireless network.

Network 102 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies. In essence, the network may include communication technologies by which information may travel between light source 104, photon receiver 106, and tracking computer device 110, as well as other computing devices not illustrated.

In various embodiments, at least a portion of network 102 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Illustrative Mobile Computer

Figure 2:
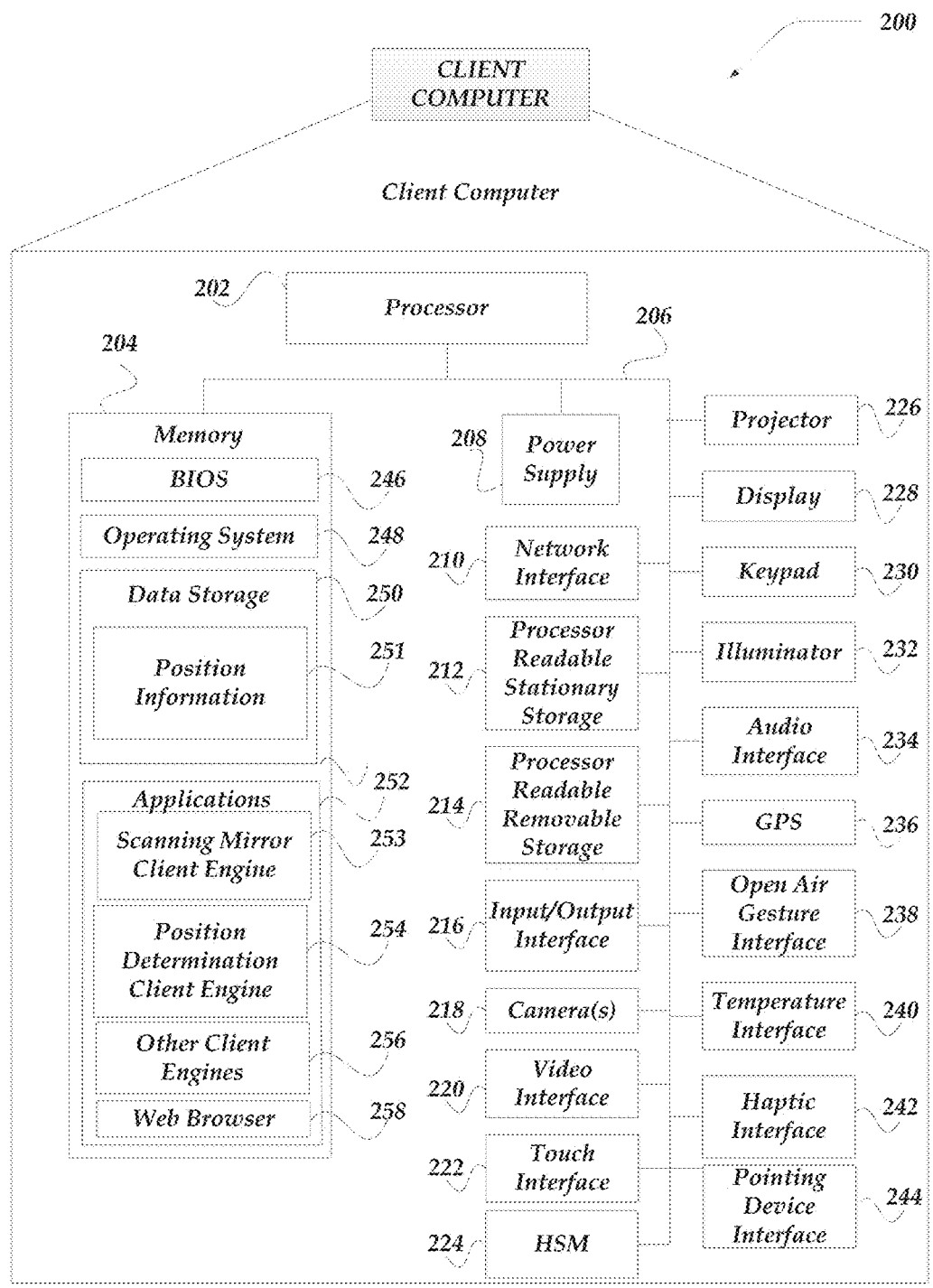
FIG. 2 illustrates an embodiment of an exemplary mobile computer that may be included in a system such as that shown in FIG. 1.

FIG. 2 shows one embodiment of an exemplary mobile computer 200 that may include many more or less components than those exemplary components shown. Mobile computer 200 may represent, for example, one or more embodiment of laptop computer 112, smartphone/tablet 114, and/or computer 110 of system 100 of FIG. 1. Thus, mobile computer 200 may include a mobile device (e.g., a smart phone or tablet), a stationary/desktop computer, or the like.

Client computer 200 may include processor 202 in communication with memory 204 via bus 206. Client computer 200 may also include power supply 208, network interface 210, processor-readable stationary storage device 212, processor-readable removable storage device 214, input/output interface 216, camera(s) 218, video interface 220, touch interface 222, hardware security module (HSM) 224, projector 226, display 228, keypad 230, illuminator 232, audio interface 234, global positioning systems (GPS) transceiver 236, open air gesture interface 238, temperature interface 240, haptic interface 242, and pointing device interface 244. Client computer 200 may optionally communicate with a base station (not shown), or directly with another computer. And in one embodiment, although not shown, a gyroscope may be employed within client computer 200 for measuring and/or maintaining an orientation of client computer 200.

Power supply 208 may provide power to client computer 200. A rechargeable or non-rechargeable battery may be used to provide power. The power may also be provided by an external power source, such as an AC adapter or a powered docking cradle that supplements and/or recharges the battery.

Network interface 210 includes circuitry for coupling client computer 200 to one or more networks, and is constructed for use with one or more communication protocols and technologies including, but not limited to, protocols and technologies that implement various portions of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or various ones of a variety of other wireless communication protocols. Network interface 210 is sometimes known as a transceiver, transceiving device, or network interface card (NIC).

Audio interface 234 may be arranged to produce and receive audio signals such as the sound of a human voice. For example, audio interface 234 may be coupled to a speaker and microphone (not shown) to enable telecommunication with others and/or generate an audio acknowledgement for some action. A microphone in audio interface 234 can also be used for input to or control of client computer 200, e.g., using voice recognition, detecting touch based on sound, and the like.

Display 228 may be a liquid crystal display (LCD), gas plasma, electronic ink, light emitting diode (LED), Organic LED (OLED) or various other types of light reflective or light transmissive displays that can be used with a computer. Display 228 may also include the touch interface 222 arranged to receive input from an object such as a stylus or a digit from a human hand, and may use resistive, capacitive, surface acoustic wave (SAW), infrared, radar, or other technologies to sense touch and/or gestures.

Projector 226 may be a remote handheld projector or an integrated projector that is capable of projecting an image on a remote wall or various other reflective objects such as a remote screen.

Video interface 220 may be arranged to capture video images, such as a still photo, a video segment, an infrared video, or the like. For example, video interface 220 may be coupled to a digital video camera, a web-camera, or the like. Video interface 220 may comprise a lens, an image sensor, and other electronics. Image sensors may include a complementary metal-oxide-semiconductor (CMOS) integrated circuit, charge-coupled device (CCD), or various other integrated circuits for sensing light.

Keypad 230 may comprise various input devices arranged to receive input from a user. For example, keypad 230 may include a push button numeric dial, or a keyboard. Keypad 230 may also include command buttons that are associated with selecting and sending images.

Illuminator 232 may provide a status indication and/or provide light. Illuminator 232 may remain active for specific periods of time or in response to event messages. For example, if illuminator 232 is active, it may backlight the buttons on keypad 230 and stay on while the client computer is powered. Also, illuminator 232 may backlight these buttons in various patterns if particular actions are performed, such as dialing another client computer. Illuminator 232 may also cause light sources positioned within a transparent or translucent case of the client computer to illuminate in response to actions.

Further, client computer 200 may also comprise HSM 224 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 224 may be a stand-alone computer, in other cases, HSM 224 may be arranged as a hardware card that may be added to a client computer.

Client computer 200 may also comprise input/output interface 216 for communicating with external peripheral devices or other computers such as other client computers and network computers. The peripheral devices may include an audio headset, virtual reality headsets, display screen glasses, remote speaker system, remote speaker and microphone system, and the like. Input/output interface 216 can utilize one or more technologies, such as Universal Serial Bus (USB), Infrared, Wi-Fi™, WiMax, Bluetooth™, and the like.

Input/output interface 216 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 242 may be arranged to provide tactile feedback to a user of the client computer. For example, the haptic interface 242 may be employed to vibrate client computer 200 in a particular way if another user of a computer is calling. Temperature interface 240 may be used to provide a temperature measurement input and/or a temperature changing output to a user of client computer 200.

Open air gesture interface 238 may sense physical gestures of a user of client computer 200, for example, by using single or stereo video cameras, radar, a gyroscopic sensor inside a computer held or worn by the user, or the like. Camera 218 may be used to track physical eye movements of a user of client computer 200.

GPS transceiver 236 can determine the physical coordinates of client computer 200 on the surface of the Earth, which typically outputs a location as latitude and longitude values. GPS transceiver 236 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 236 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 228 or keypad 230 can instead be routed through network interface 210 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 246 for controlling low-level operation of client computer 200. The memory may also store operating system 248 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 250, which can be utilized by client computer 200 to store, among other things, applications 252 and/or other data. For example, data storage 250 may also be employed to store information that describes various capabilities of client computer 200. In one or more of the various embodiments, data storage 250 may store position information 251.

The information 251 may then be provided to another device or computer based on various ones of a variety of methods, including being sent as part of a header during a communication, sent upon request, or the like. Data storage 250 may also be employed to store social networking information including address books, buddy lists, aliases, user profile information, or the like. Data storage 250 may further include program code, data, algorithms, and the like, for use by a processor, such as processor 202 to execute and perform actions. In one embodiment, at least some of data storage 250 might also be stored on another component of client computer 200, including, but not limited to, non-transitory processor-readable stationary storage device 212, processor-readable removable storage device 214, or even external to the client computer.

Applications 252 may include computer executable instructions which, if executed by client computer 200, transmit, receive, and/or otherwise process instructions and data. Applications 252 may include, for example, scanning mirror client engine 253, position determination client engine 254, other client engines 256, web browser 258, or the like. Client computers may be arranged to exchange communications, such as, queries, searches, messages, notification messages, event messages, alerts, performance metrics, log data, API calls, or the like, combination thereof, with application servers, network file system applications, and/or storage management applications.

The web browser engine 226 may be configured to receive and to send web pages, web-based messages, graphics, text, multimedia, and the like. The client computer's browser engine 226 may employ virtually various programming languages, including a wireless application protocol messages (WAP), and the like. In one or more embodiments, the browser engine 258 is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In one or more embodiments, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
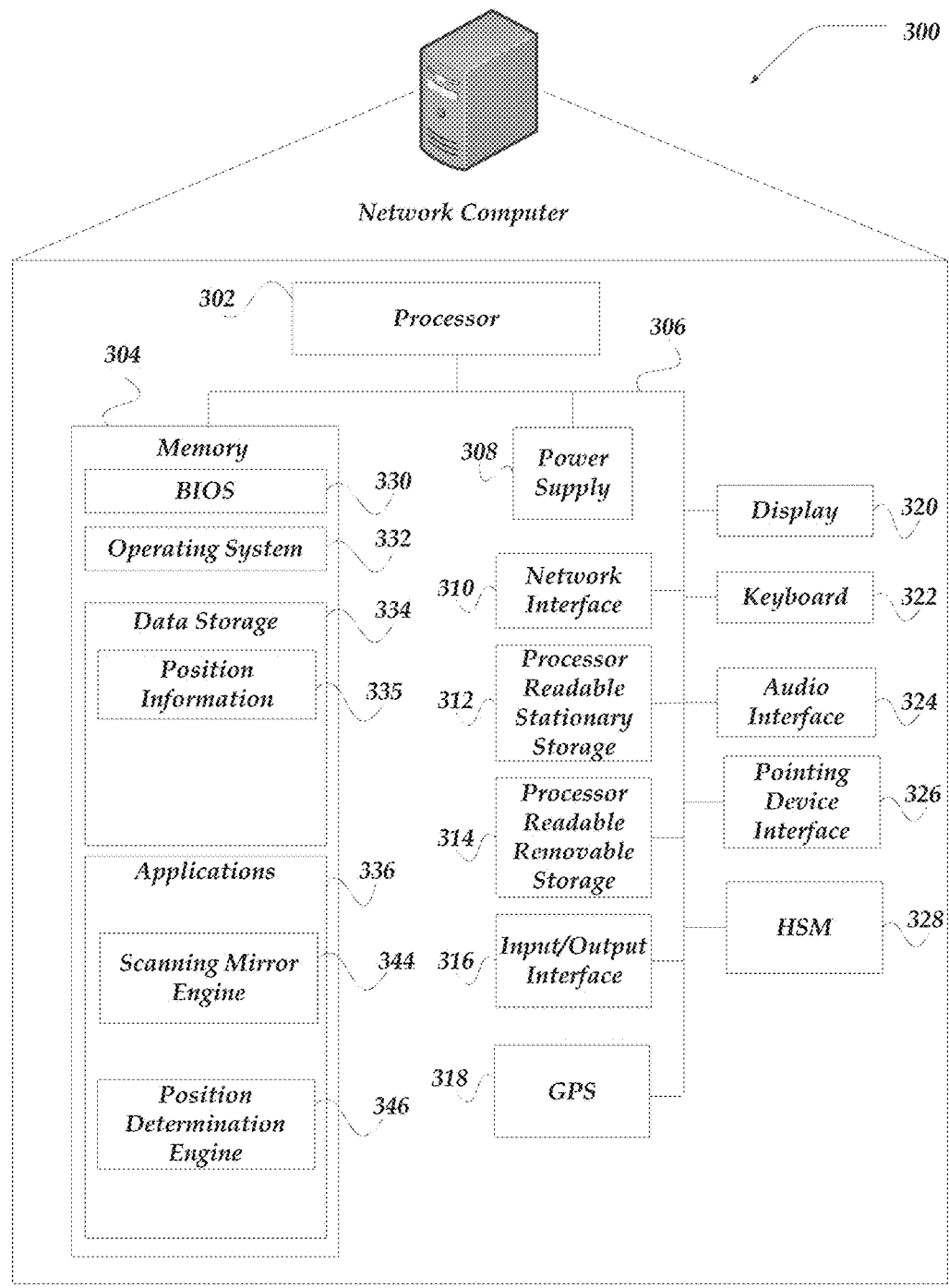
FIG. 3 shows an embodiment of an exemplary network computer that may be included in a system such as that shown in FIG. 1.

FIG. 3 shows one embodiment of an exemplary network computer 300 that may be included in an exemplary system implementing one or more of the various embodiments. Network computer 300 may include many more or less components than those shown in FIG. 3. However, the components shown are sufficient to disclose an illustrative embodiment for practicing these innovations. Network computer 300 may include a desktop computer, a laptop computer, a server computer, a client computer, and the like. Network computer 300 may represent, for example, one embodiment of one or more of laptop computer 112, smartphone/tablet 114, and/or computer 110 of system 100 of FIG. 1.

As shown in FIG. 3, network computer 300 includes a processor 302 that may be in communication with a memory 304 via a bus 306. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 308, network interface 310, processor-readable stationary storage device 312, processor-readable removable storage device 314, input/output interface 316, GPS transceiver 318, display 320, keyboard 322, audio interface 324, pointing device interface 326, and HSM 328. Power supply 308 provides power to network computer 300.

Network interface 310 includes circuitry for coupling network computer 300 to one or more networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 310 is sometimes known as a transceiver, transceiving device, or network interface card (NIC). Network computer 300 may optionally communicate with a base station (not shown), or directly with another computer.

Audio interface 324 is arranged to produce and receive audio signals such as the sound of a human voice. For example, audio interface 324 may be coupled to a speaker and microphone (not shown) to enable telecommunication with others and/or generate an audio acknowledgement for some action. A microphone in audio interface 324 can also be used for input to or control of network computer 300, for example, using voice recognition.

Display 320 may be a liquid crystal display (LCD), gas plasma, electronic ink, light emitting diode (LED), Organic LED (OLED) or various other types of light reflective or light transmissive display that can be used with a computer. Display 320 may be a handheld projector or pico projector capable of projecting an image on a wall or other object.

Network computer 300 may also comprise input/output interface 316 for communicating with external devices or computers not shown in FIG. 3. Input/output interface 316 can utilize one or more wired or wireless communication technologies, such as USB™, Firewire™, Wi-Fi™ WiMax, Thunderbolt™, Infrared, Bluetooth™, Zigbee™, serial port, parallel port, and the like.

Also, input/output interface 316 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 320 or keyboard 322 can instead be routed through the network interface 310 to appropriate human interface components located elsewhere on the network. Human interface components include various components that allow the computer to take input from, or send output to, a human user of a computer. Accordingly, pointing devices such as mice, styluses, track balls, or the like, may communicate through pointing device interface 326 to receive user input.

GPS transceiver 318 can determine the physical coordinates of network computer 300 on the surface of the Earth, which typically outputs a location as latitude and longitude values. GPS transceiver 318 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 318 can determine a physical location for network computer 300. In one or more embodiments, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 330 for controlling low-level operation of network computer 300. The memory also stores an operating system 332 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 334, which can be utilized by network computer 300 to store, among other things, applications 336 and/or other data. For example, data storage 334 may also be employed to store information that describes various capabilities of network computer 300. In one or more of the various embodiments, data storage 334 may store position information 335. The position information 335 may then be provided to another device or computer based on various ones of a variety of methods, including being sent as part of a header during a communication, sent upon request, or the like. Data storage 334 may also be employed to store social networking information including address books, buddy lists, aliases, user profile information, or the like. Data storage 334 may further include program code, data, algorithms, and the like, for use by one or more processors, such as processor 302 to execute and perform actions such as those actions described below. In one embodiment, at least some of data storage 334 might also be stored on another component of network computer 300, including, but not limited to, non-transitory media inside non-transitory processor-readable stationary storage device 312, processor-readable removable storage device 314, or various other computer-readable storage devices within network computer 300, or even external to network computer 300.

Applications 336 may include computer executable instructions which, if executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 336 may include scanning mirror engine 344 or position determination engine 346 that performs actions further described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, position determination engine 346 may be operative in a cloud-based computing environment. In one or more of the various embodiments, these applications, and others, may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines and/or virtual servers dedicated to scanning mirror engine 344 or position determination engine 346 may be provisioned and de-commissioned automatically.

Also, in one or more of the various embodiments, scanning mirror engine 344 or position determination engine 346 or the like may be located in virtual servers running in a cloud-based computing environment rather than being tied to one or more specific physical network computers.

Further, network computer 300 may comprise HSM 328 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 328 may be a stand-alone network computer, in other cases, HSM 328 may be arranged as a hardware card that may be installed in a network computer.

Additionally, in one or more embodiments (not shown in the figures), the network computer may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Devices and Systems

Scanning mirrors have a multitude of uses including, but not limited to, scanning laser vision, motion tracking LIDAR, illumination, and imaging type display systems for AR and VR, such as described in U.S. Pat. Nos. 8,282,222; 8,430,512; 8,573,783; 8,696,141; 8,711,370; 8,971,568; 9,377,553; 9,501,175; 9,581,883; 9,753,126; 9,810,913; 9,813,673; 9,946,076; U.S. Patent Application Publication Nos. 2013/0300637 and 2016/0041266; U.S. Provisional Patent Application Ser. Nos. 62/498,534; 62/606,879; 62/707,194; and 62/709,715 and U.S. patent application Ser. No. 15/853,783. each of which is herein incorporated by reference in the entirety.

The devices and systems can employ high speed MEMS scanning mirror systems. In many applications the speed and other specific motion characteristics of the scan system facilitate precisely rendering, detecting or tracking finely detailed contrast functions (for example, strings of 3D pixels) and voxels (for example, 3D positions) in the field of view.

Often resonant scan mirrors are used, as they deliver high speeds coupled with reasonable scan angles and use relatively low energy. The present disclosure describes innovations that apply to such resonant systems and can significantly improve them. Innovations described in the present disclosure can also apply to non-resonant MEMS scanning mirrors or other non-MEMS type scanning systems (e.g. so-called Galvo or Polygonal scanning systems and the like), or even non-mechanical systems, or "solid state" scanning systems such Optical Phased arrays or accousto-optical and electro-optical scanning systems).

Figure 4A:
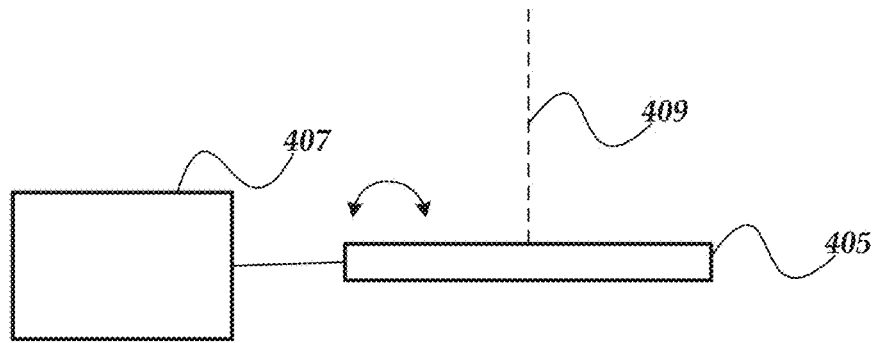
FIG. 4A illustrates an embodiment of a scanning mirror arrangement or system.
Figure 4B:
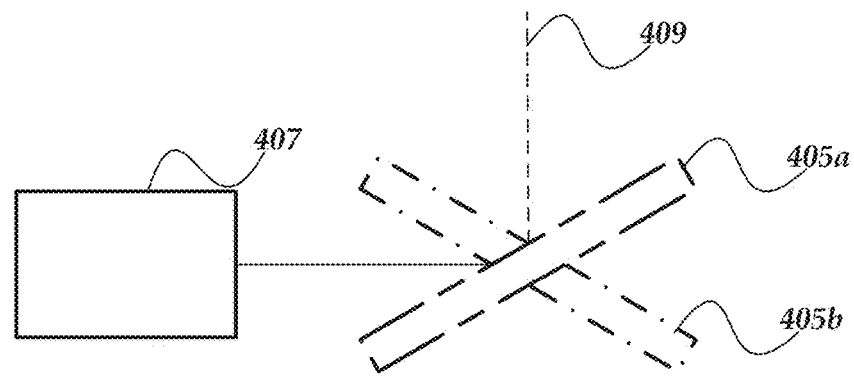
FIG. 4B illustrates rotation of the mirror of the scanning mirror arrangement or system of FIG. 4A.

FIG. 4A is a block diagram of components of a scanning mirror arrangement including the mirror 405 and the drive mechanism or actuator 407 that drives the rotation of the mirror about an axis, as illustrated in FIG. 4B where the mirror 405 is illustrated as rotated at two extreme positions 405a, 405b. In FIG. 4A, the mirror 405 is rotated to a midway position between the two extreme positions and defines a center axis 409 perpendicular to the surface of the mirror. In at least some embodiments, the mirror 405 is configured to rotate up to ±60, ±50, ±40, ±30, ±20, ±10 degrees relative to the midway position illustrated in FIG. 4A, although larger or smaller rotations can also be used. Although the mirror 405 in the embodiment illustrated in FIG. 4B rotates by equal, but opposite, amounts to reach the two extreme positions 405a, 405b, in other embodiments, the two extreme positions may involve unequal rotation (e.g., a different amount of rotation in degrees) in the two opposing direction. Other examples of scanning mirror arrangements are presented in FIGS. 9A and 9B and discussed below.

As an example of a conventional scanning mirror, a 25 kHz resonant mirror with a diameter of around 1 mm can draw two lines in each 40 microsecond scan period, delivering 50,000 scan lines per second. If drawing an image at 100 frames per second, it would at most be able to scan 500 lines across each frame.

For high resolution imaging systems, there are several mirror design parameters that can be challenging to manage or optimize. First, a high line resonance frequency keeps the resonant mirror small and with a relative low resonant mass. The scanning system further utilizes a stiff spring in the hinges, which acts as a dampener on the mirrors' deflection angle, typically resulting in a small scan angle and a small angular scan range.

Second, a wide scan field (for a wide field of view (FoV)) is often desirable, but due to the inherent dynamics of a conventional resonant MEMS mirror design, this typically results in slower scan speeds (by, for example, increasing the mass or reducing the stiffness of the spring type hinges holding the mirror).

Third, a mirror surface with high quality optical characteristics is desirable for achieving good beam quality and for achieving a relative high resolution laser point with a small, sharp laser beam "tip" (i.e., the smallest resolved voxel spot illumination). In some systems to achieve a good depth of field, a very flat, stiff and relatively large mirror surface is needed to be able to maintain a relatively high degree of collimation of the laser beam. At higher resonance frequencies the stresses on the mirror are significantly greater, and mirror stiffness becomes particularly important. Stiffness requires more structural strength in the mirror body structure, and typically makes the mirror heavier. For example, a 2 mm, 2× larger mirror results in significantly better collimation and far field spot size as compared to a faster 1 mm mirror. Such a larger mirror may have eight times larger mass, which might reduce the resonance frequency by more than half (e.g., the square root of 8). Some modern high speed MEMS mirror designs use honeycomb structures to achieve a maximum stiffness at minimal mass for a given mirror size. For good, long range beam quality useful for automotive LIDAR systems the desired stiffness and size of the mirror surface typically results in larger surfaces with robust backing structures which limit the resonant frequency to below 5 kHz.

Fourth, uniform illumination scan coverage is desirable in many such systems, either to achieve acceptable image brightness and uniformity across a broad field of view or to guarantee that sufficient illumination is applied to every point in the field of view of a machine vision system. Lack of illumination brightness and uniformity of illumination across a wide scan range would reduce the range and FoV width respectively of such scanned interrogation beam systems.

These four design parameters are often in starkly opposite directions, and in many conventional designs significant trade-offs are made between the design parameters which may limit system performance parameters such a resolution, range, and voxel acquisition rate.

Figure 4C:
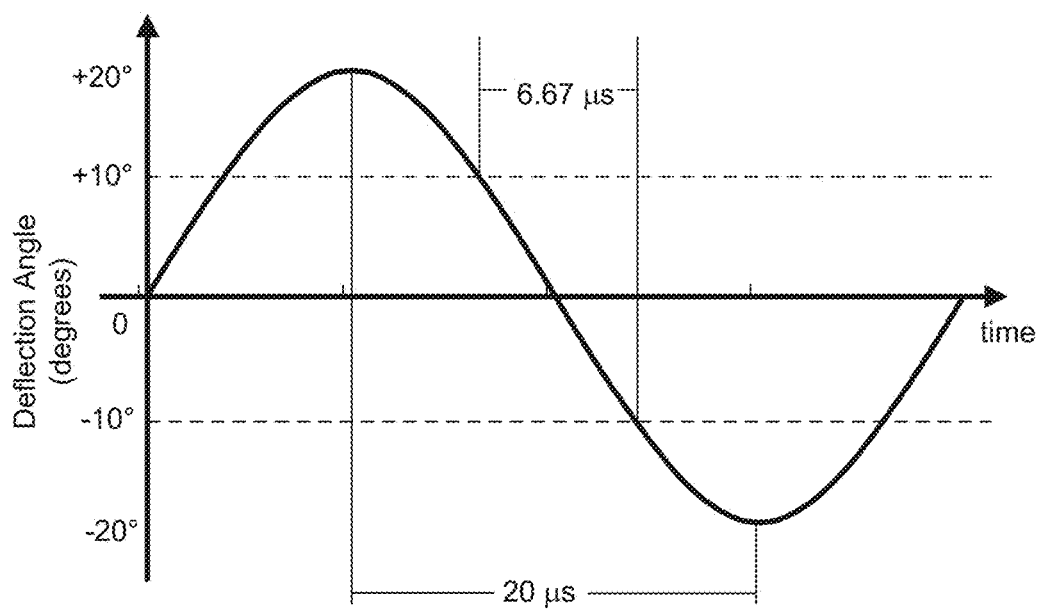
FIG. 4C illustrates a sinusoidal operation of the scanning mirror arrangement or system of FIG. 4A.

In at least some embodiments, a device or system includes slowing down and increasing dwell time where it counts. One features of resonant mirrors is that their rotational speed is fundamentally sinusoidal, as illustrated in FIG. 4C. A resonant system is an energy conserving system: at midpoint of the scan mirror rotation the system is at peak velocity and at peak kinetic energy, while at the extremes of mirror motion a resonant mirror slows down to a full stop, all of the kinetic energy being transformed into mechanical energy instantiated as the spring force in the hinges of the mirror. The extreme positions are often not utilized at all. For many image rendering applications, the field of projection is "cropped" so that the most extreme positions are not actually used in the scan illumination pattern.

As an example, the optical scan width of a mirror whose axis is rotating mechanically +/−10 degrees (a mechanical scan range of 20 degrees) will swing a beam at twice that range up to +/−20 degrees (a total of 40 degrees). The actual use of this range might be only 30 degrees, to avoid the slow-moving extremes. If this mirror is used in an application where the beam must deliver a certain amount of illumination (for example, a certain intensity of laser beam energy per solid angle in the FoV) then the non-uniform motion of resonant mirrors limits the intensity in the center of projection, as the dwell time per unit area or per degree of FoV is the lowest where the rotation is the fastest. In the above example, illustrated in FIGS. 4C and 4D, the mirror swings the beam across 40 degrees during a period of 20 microseconds, but it spends only a third of its time, only 6.7 microseconds, in the middle 20 degrees of the field of view and another 6.7 microseconds on each 10 degrees left and right of that.

Figure 4D:
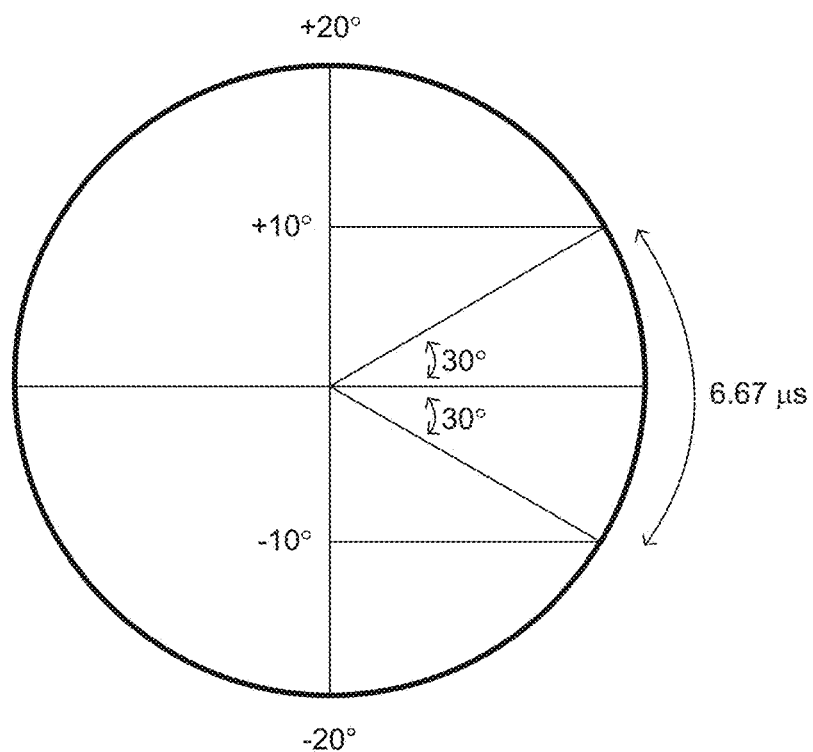
FIG. 4D illustrates a phase rotation diagram of the scanning mirror arrangement or system of FIG. 4A.

FIG. 4C illustrates the sinusoidal motion of the angle deflection. FIG. 4D illustrates a phase rotation diagram, a unit circle where the vertical axis shows the angular optical displacement of the scanning beam reflected by a resonant mirror. Optical displacement is twice the magnitude in degrees of the motion of the mirror itself. In FIG. 4D, the resonant oscillations of the mirror oscillate the beam between extremes of −20 degrees and +20 degrees, a total resonant swing back and forth of 40 degrees optical bean displacement. For the mirror to affect the full 40 degrees swing from −20 degrees to +20 degrees would take half the full 360 degrees (i.e., 180 degrees of phase of the full phase cycle of the resonant mirror) or in the case of 25 kHz mirror 20 microseconds. But with only the middle phase progression of 60 degrees of phase, in one third of the time (6.7 microseconds) the mirror rotates the beam by 20 degrees. The total oscillation period is 40 microseconds (i.e., the period a 25 kHz mirror) and a full cycle is 360 phase degrees.

An implication is that, when using a resonant type scan mirror, to achieve uniform brightness across the FoV the laser beam may need to be illuminated full brightness at the center, delivering enough energy per microsecond at the peak scan speed there, but outside the center the laser would be dimmed considerably for areas towards the edges of the FoV. So, a laser with greater peak brightness is useful to assure a sufficient range in the center of projection.

Since the peak brightness of the beam might be set by limitations of the laser or by safety regulations, some part of the system potential output is wasted because for example, the brightness is reduced markedly in the projection center. In the case of, for example, automotive illumination systems this might be just the opposite of what is desired: namely, higher brightness in the center.

To achieve a longer dwell time at the center it is possible to use the mirrors' slow extremes to illuminate the center. One solution is to use two beams that reflect on the same mirror but arranged so that the beams are crossed on the mirror, as illustrated, for example, in FIG. 5 (where only the outcoming beams are illustrated). Alternatively, one beam or one laser source may be split into two halves by optical means (for example, using a beamsplitter) and each half redirected along two separate incoming paths towards the scan mirror.

Figure 5:
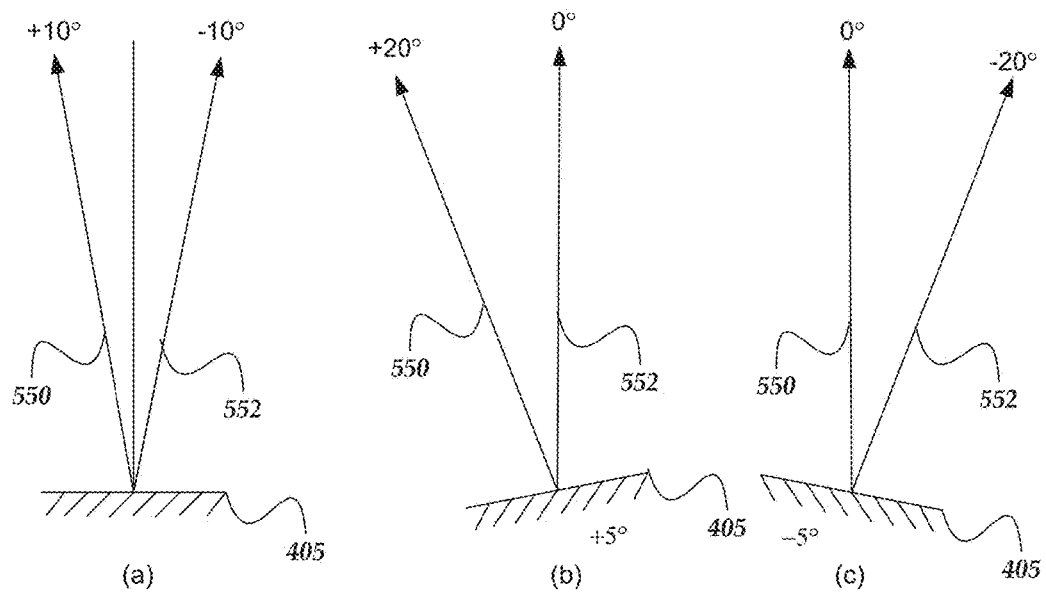
FIG. 5 illustrates an embodiment of a scanning mirror arrangement or system with illumination of the mirror by two light beams (which are only illustrated after reflection from the mirror) at different rotational positions of the mirror (a) 0°, (b) +5°, and (c) −5°.

In FIG. 5, two laser beams 550, 552 reflect off the same scan mirror surface 554 with a 20 degree spread between them, as illustrated in (a). Rotating the mirror half of the angle (i.e., mechanically back and forth 5 degrees) the two beams both will rotate 10 degrees back and forth, as illustrated in (b) and (c). Beam 552 will swing from 20 degrees to the center while beam 550 swings from the center to −20 degrees. Since the two extreme mirror positions have the longest dwell time, in each case the maximum "exposure" is covered by one of the beams. In addition, the beams 550, 552 each cover half of the FoV.

With two beams arranged this way, the mirror angular motion can be reduced by half and consequently it would be possible to increase the scan frequency significantly or increase the mirror size, the beam quality, or the FoV significantly. If the scan coverage is increased, the detection latency can be lowered and blind spots removed faster.

Figure 7A:
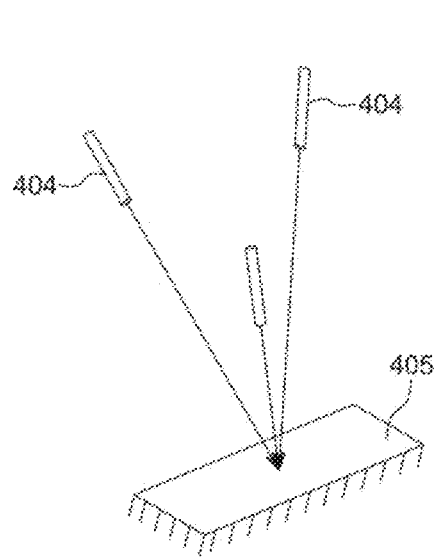
FIG. 7A illustrates an embodiment of a scanning mirror arrangement or system with illumination of the mirror by three light beams (which are only illustrated prior to reflection by the mirror)
Figure 7B:
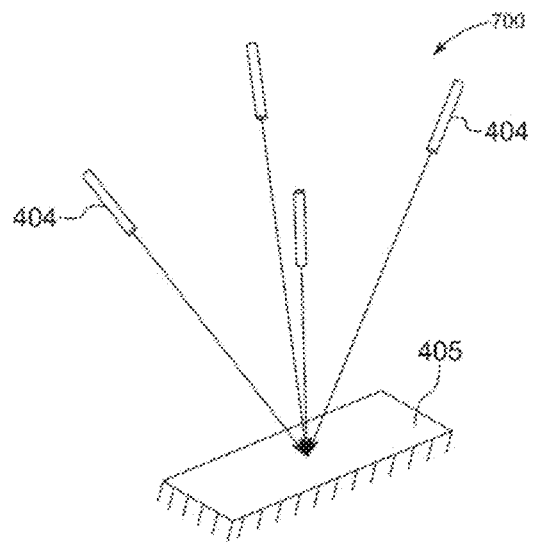
FIG. 7B illustrates an embodiment of a scanning mirror arrangement or system with illumination of the mirror by four light beams (which are only illustrated prior to reflection by the mirror)

Three or more beams, from light sources 404, may also be used cross over on a mirror 405, as illustrated in FIGS. 7A and 7B, to further increase the scan coverage and to increase light power, but to distribute it in a way that complies fully with safety regulations. Each of the beams may be limited to, for example, 100 mW intensity, but three such beams can be arranged to not ever point in the same directions, yet each might at some part of the scan rotation dwell in the center providing maximum illumination coverage in that area. This may work well as a modification for a fast biaxial Lissajous scan using two resonant mirrors in a relay such as those described in U.S. Pat. Nos. 8,711,370; 9,377,533; 9,753,126; and 9,946,076, all of which are incorporated herein by reference in their entireties. Also, as illustrated in FIGS. 7A and 7B, the light sources 404 do not need to be in the same plane.

In the case of a trifocal architecture, such as described in U.S. Provisional Patent Application Ser. Nos. 62/498,534 and 62/606,879 and U.S. patent application Ser. No. 15/853,783, all of which are incorporated herein by reference in their entireties, it might be desirable to have four simultaneous points, using four light sources 404 or light beams as illustrated in FIG. 7B, in the FoV. This arrangement of four light sources may be particularly useful with the three receiver (e.g., camera) arrangement of FIG. 8 with three cameras 106a, 160b, 106c where the four light beams from the four light sources 404 (FIG. 7B) reflect from the mirror 405 (FIG. 7B) and simultaneously illuminates four points $P_1$, $P_2$, $P_3$ and $P_4$. The four points on the 3D surface reflect a portion of the beam towards three cameras positioned with camera projection centers $O_1$, $O_2$ & $O_3$. From each point P there is one chief ray to each of these camera centers. There are twelve such chief rays. These chief rays project onto the cameras in twelve pixel locations: $P_1'$, $P_2'$, $P_3'$, $P_4'$, $P_1''$, $P_2''$, $P_3''$, $P_4''$, $P_1'''$, $P_2'''$, $P_3'''$ & $P_4'''$. These twelve discrete positions captured by three cameras are sufficient to derive the full positions of the camera centers and the four 3D points $P_1$, $P_2$, $P_3$ and $P_4$. As an example, these twelve sensor coordinates pairs are sufficient to derive a full trifocal tensor's 27 elements (a 3×3×3 matrix.) This is modification of the arrangement presented in U.S. patent application Ser. No. 15/853,783, which is incorporated herein by reference in its entirety. In at least some embodiments, each of the receivers 106a, 160b, 106c (e.g., cameras) can be instantly calibrated in six degrees of freedom (this would enable very flexible camera mounts and eliminate or reduce body rigidity requirements).

Figure 6:
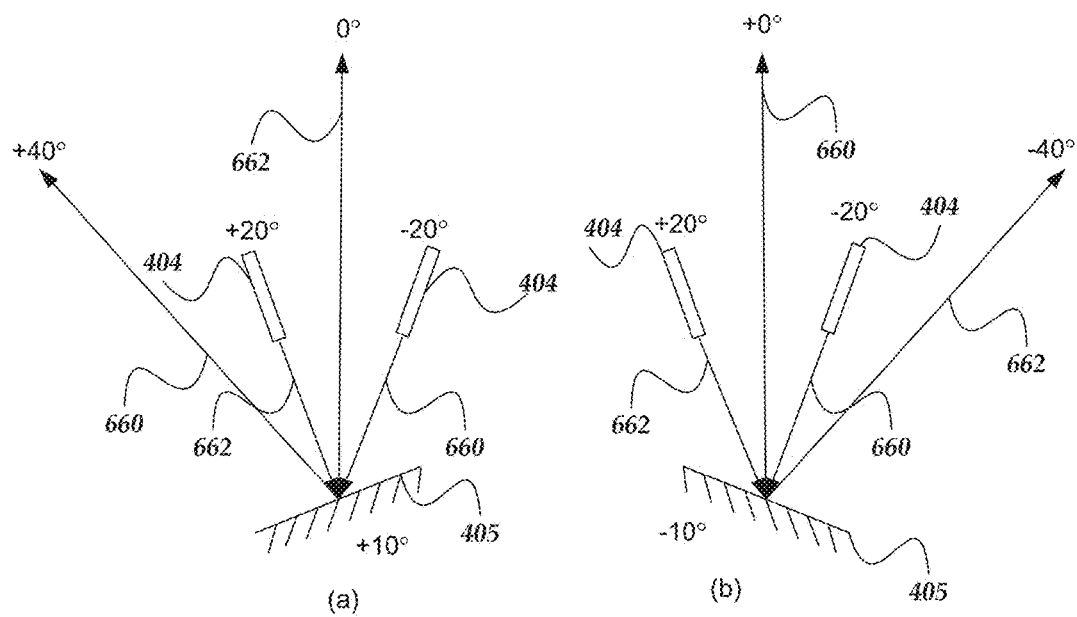
FIG. 6 illustrates an embodiment of a scanning mirror arrangement or system with illumination of the mirror by two light beams at different rotational positions of the mirror (a) +10° and (b) −10°.

In at least some embodiments, by arranging some of the beams at greater degrees, eccentric, wide and narrow scans could be selected electronically and instantly without any mechanical or optical adjustments. In FIG. 6, the beams 660, 662 are 20 degrees offset each from the central projection axis 664. As can be seen: a +/−10 degree mirror movement creates a full +/−40 degree coverage.

By arranging a plurality of beams with deliberately offset angles and have them cross over onto the same fast scanning mirror, the total scan width and dwell time can be increased and the angular instantaneous scan velocity can be decreased in certain parts of the scan field. Some parts of the multiple beams scan ranges can be further overlapped to increase the scan frequency and coverage in one or more foveated area(s).

In at least some embodiments, each of the multiple (for example, two, three, four, or more) light beams can cover at least 10, 20, 25, 30, or 40 degrees or more as the mirror rotates between positions. In at least some embodiments, the multiple light beams are arranged to cover different portions of the FoV without overlapping or with overlapping. For arrangements with more than two light beams, the light beams can be spaced apart uniformly or non-uniformly.

In at least some embodiments, each of the light beams is spaced from each of the other light beams by at least 5, 10, 15, 20 or more degrees relative to the mirror. In at least some embodiments, at least two of the light beams, when the mirror is in the midway position, as illustrated in FIG. 4A, are on opposite sides of the center axis 409.

Figure 10:
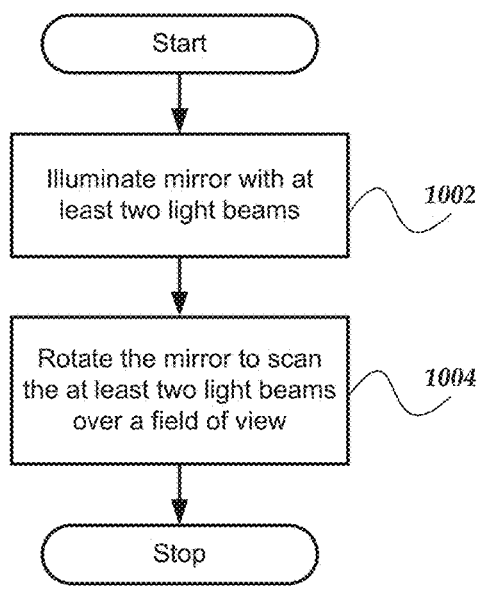
FIG. 10 is a flowchart of an embodiment of a method of scanning a field of view.

FIG. 10 is a flowchart of one method of scanning a field of view. In step 1002, the mirror is simultaneously illuminated with at least two light beams (for example, two, three, four, or more light beams) as described above. In step 1004, the mirror is rotated (for example, rotated between two extreme positions) to scan the field of view. The field of view can be, for example, 10, 20, 30, 40, 50, 60, 80, 100, 120 degrees or more.

Figure 8:
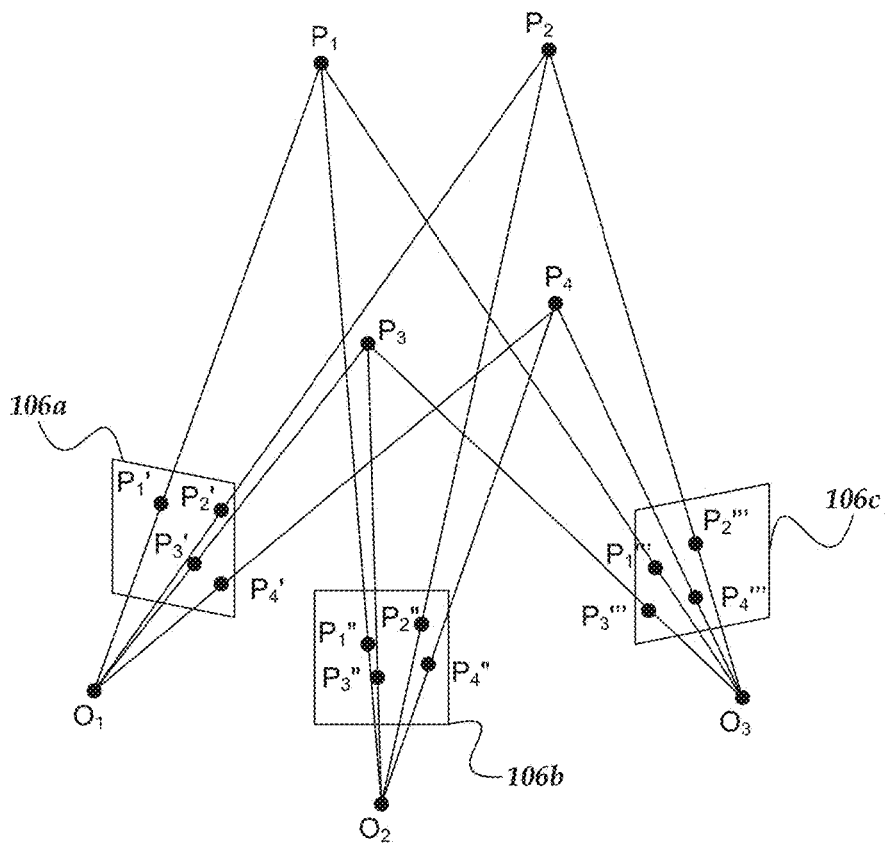
FIG. 8 illustrates an embodiment of a system for determining a position of an object using the scanning mirror system or arrangement of FIG. 7B.

In pixel sequential imaging systems, such as those described in the references cited above and embodiments of the systems illustrated in FIGS. 1 and 8, it is often desirable that the optical scan width is relatively large, and consequently the deflection angle of the mirror system well be larger than is optimal for other considerations and significant tradeoffs need to be made. To configure a high-resonance frequency system with a large scan angle can be particularly challenging. One reason is that for scan force actuation mechanisms, such as electrostatic comb drivers, the maximum achievable scan angle often is a limiting factor. Comb-type actuators typically have a limited range (e.g., depth of blades) beyond which they cannot create an electrostatic force. Simple plate electrostatic drives and or piezo actuators are often preferred and much more robust as long as the actuation range or "stroke" can be held as small as possible ("stroke" refers to the distance—in opposing plate type—or rotational movement in a torsion hinge type of that one part of the electromechanical actuator that moves with respect to the other part).

Some systems that do accommodate a larger range of motion are bulkier, or more difficult to assemble such as, for example, those that employ inductive magnetic field forces, by including permanent magnets in the assembly of the scanner or inductive loops and connections in the mirror itself (adding bulk and mass, consequently slowing down the mirror)

A pseudo-random scan system does not require precise control of the beam position. Control of the beam is of less importance than speed and scan range. In pseudo random systems such as those described in the references cited above and embodiments of the systems illustrated in FIGS. 1 and 8, the system's accuracy is not relying on controlling the mirror's instantaneous position, but rather on observing the beam directly in the FoV. For example, in a trifocal 3D motion tracking system such as that illustrated in FIG. 8 or described in U.S. patent application Ser. No. 15/853,783, it is only required that fine-tipped beams scan pseudo-randomly in as many as possible scan arcs or scan lines across a region of interest within a short time period. The low latency nanosecond precise observational accuracy of 3 "twitchy pixel" sensors or SPAD arrays more than make up for the mirror's wild and uncontrolled motion.

Figure 11:
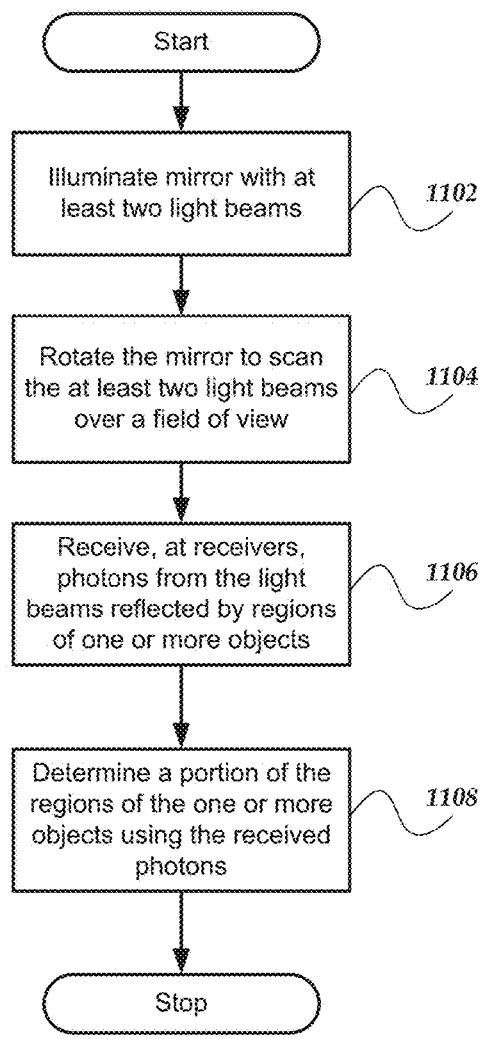
FIG. 11 is a flowchart of an embodiment of a method of determining a position of an object in a field of view.

FIG. 11 is a flowchart of one method of determining a position of one or more objects. In step 1102, the mirror is simultaneously illuminated with at least two light beams (for example, two, three, four, or more light beams) as described above. In step 1104, the mirror is rotated (for example, rotated between two extreme positions) to scan the field of view. The light beams reflected by the mirror will illuminate regions of one or more objects in the field of view. The field of view can be, for example, 10, 20, 30, 40, 50, 60, 80, 100, 120 degrees or more. In step 1106, photons from the light beams, which are reflected by regions of the one or more objects, are then received at receivers, for example, cameras or arrays of photo-sensitive pixels or the like. In step 1108, the received photons are used to determine the position of the regions of the one or more objects. For example, any of the methods and systems described in U.S. Pat. Nos. 8,282, 222; 8,430,512; 8,573,783; 8,696,141; 8,711,370; 9,377, 553; 9,753,126; 9,946,076; U.S. Patent Application Publication Nos. 2013/0300637 and 2016/0041266; U.S. Provisional Patent Application Ser. Nos. 62/498,534 and 62/606,879; and U.S. patent application Ser. No. 15/853,783 can be modified as described herein to facilitate determination of the position or other features of objects in the field of view.

Figure 9A:
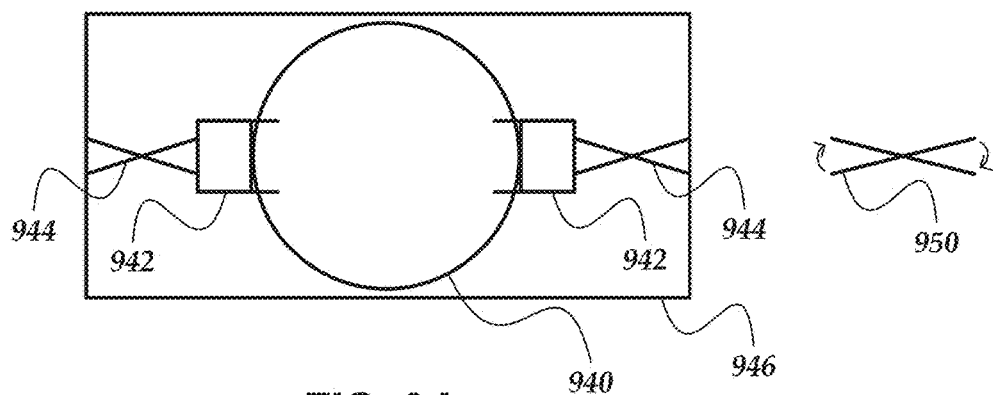
FIG. 9A illustrates an embodiment of a scanning mirror arrangement or system with a driving mechanism disposed between a mirror and hinges.
Figure 9B:
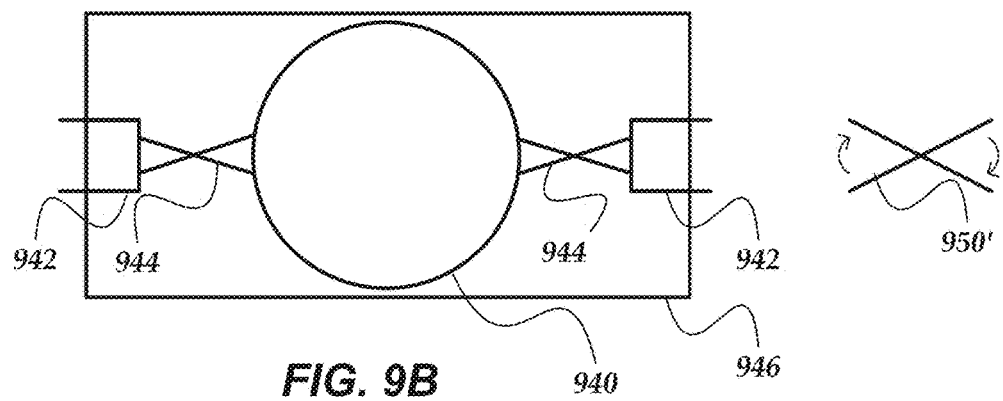
FIG. 9B illustrates an embodiment of a scanning mirror arrangement or system with hinges disposed between a mirror and a driving mechanism.

Turning to FIGS. 9A and 9B, a scan mirror has four fundamental elements: the mirror 940, a drive mechanism (or actuator) 942 that creates a driving force, a hinge 944 that allows for rotational motion 950 of the mirror, and a mounting bracket 946 that holds the assembly in place. FIG. 9A illustrates one conventional scan mirror assembly in a conceptual drawing (not to scale). The bracket 946 holds the hinge 944 which provides the axis of rotation along which the mirror 940 rotates. The drive mechanism 942 is attached to the mirror 940 and imparts rotational forces in some fashion directly to the mirror. In a conventional scan mirror 940 the hinge 944 acts as a torsional spring that produces rotational forces that drive the mirror back to its central position. The hinge 944 is between the bracket 946 and the drive mechanism 942.

FIG. 9B illustrates a new arrangement where the drive mechanism 942 is mounted directly on the bracket 946 and rotates the hinge 944. In this manner, the springy hinge 944 is inserted between the drive mechanism 942 and the mirror 940. This produces a much greater degree of rotational motion 950' for the mirror 940 than would be imparted by the rotational motion of the drive mechanism 942. A small amplitude rotational twist of the drive mechanism can impart more than sufficient energy in a well-designed resonant system to create large angular mirror motions at resonance. For example, the drive mechanism 942 (such as a piezo or electrostatic MEMS force actuator) may only twist the hinge 944 by +/−1 degree and yet the hinge may swing the mirror 940 swing by +/−10 degrees, achieving an optical deflection of 40 degrees (the optical deflection is twice the mechanical deflection).

In at least some embodiments, a scanning mirror arrangement or system can have a maximum scan range of 60 to 120 degrees. In at least some embodiments, a scanning mirror arrangement or system can have substantial uniformity of illumination with multiple slow scan foveation spots. In at least some embodiments, a scanning mirror arrangement or system can have a simple, compact and robust integral hinge and actuator design. In at least some embodiments, a scanning mirror arrangement or system can have good high frequency scan coverage (with overlaps for a high number of scan lines/second. In at least some embodiments, a scanning mirror arrangement or system can have good beam quality. At least some scanning mirror arrangements or systems can have any combination of these features or advantages.

Figure 12A:
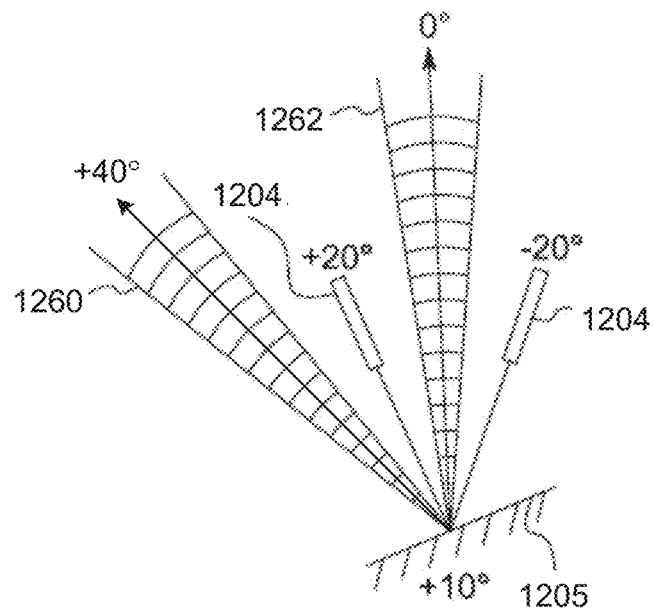
FIGS. 12A to 12B illustrate an embodiment of a scanning mirror arrangement or system with illumination of the mirror by two light beams at different rotational positions of the mirror (12A) +10° and (12B) −10° with diffuse reflection of the light.
Figure 12B:
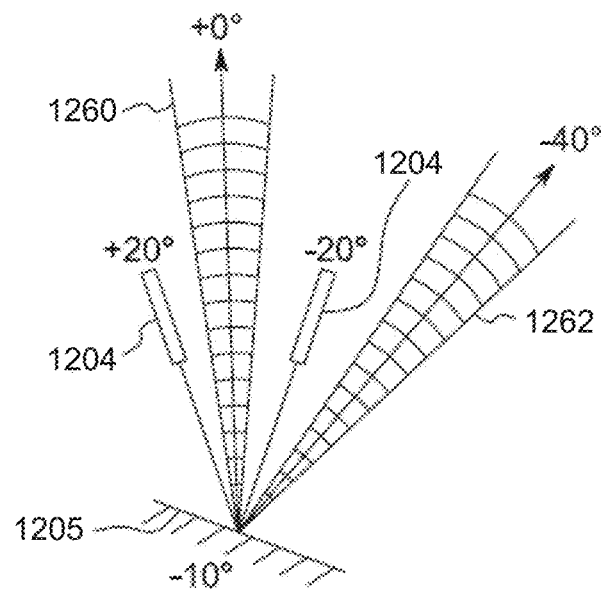

FIGS. 12A to 14C illustrate arrangements to create a wide scan range by arranging a plurality of light sources converging from different directions onto a shared scanning mirror. In FIGS. 12A and 12B, in an arrangement similar to the one depicted in FIG. 6 above, two laser beams converge from light sources 1204 onto a single scan mirror 1205. The scan mirror 1205 redirects and partially diffuses the laser beams into still fairly narrowly focused scanning spot lights. The diffusion may be effected by, for example, a diffusive structure deposited of the mirror itself or a diffuser may be part of the illumination source collimation optics, or the diffusion may be caused by the laser beams scattering onto a phosphor-like fluorescent material or using any other suitable diffusion technique. In FIG. 12A, the scan mirror 1204 is angled at one of its extremes, tilting at, for example, +10 degrees to the left, adding, in this example, an additional +20 degrees leftwards deflection to one of beams, beam 1260 and, at the same moment, directing the other beam 1262 straight ahead, towards the center of the FoV. In FIG. 12B, the mirror 1205 is tilted in the opposite extreme position of, for example, rightward −10 degrees, and the beam 1262 which was previously directed straight ahead, is now rotated −40 degrees to the extreme right. This illustrative example shows that with just a +/−10 degrees motion a low-power simple resonant mirror, can scan rapidly and achieve strong scene illumination across a wide range of angles. This embodiment of a system reaches a full width FoV angle of 80 degrees, four times the mechanical range of mirror itself. Yet, this same system is equally capable of illuminating the center of the FoV, with long exposures (due to an oscillating mirror's natural long dwell times at the mirror's rotational extreme positions) because of the particular arrangement of the light sources 1204. In this exemplary arrangement with converging dual beams, a slowly moving, diffuse light beam moves slowly across the center of the field of view twice during the same cycle: First, light beam 1262 in FIG. 12A and then light beam 1260 in FIG. 12B.

Figure 13A:
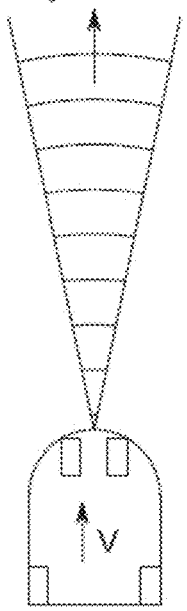
FIGS. 13A to 13C illustrate an embodiment of a device with a single scanning headlight during different modes of operation.
Figure 13B:
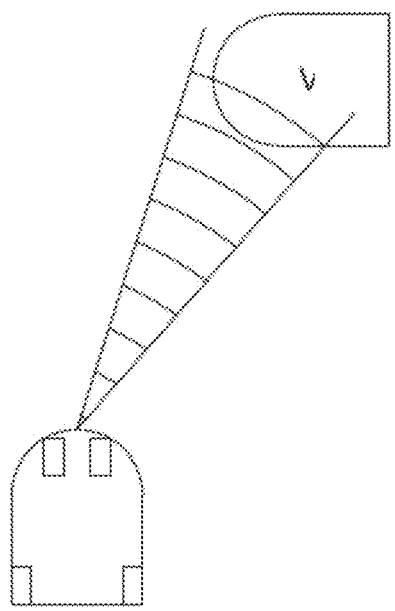
Figure 13C:
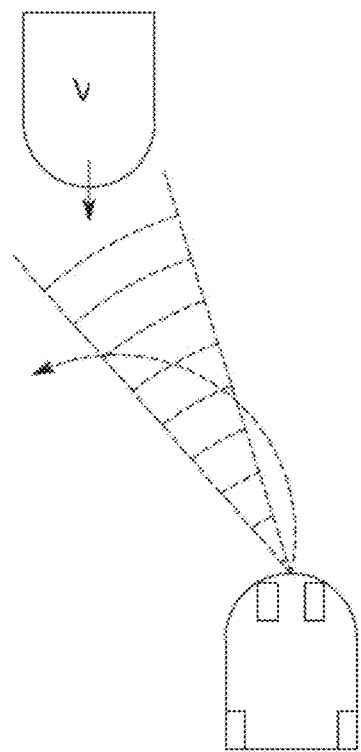

FIGS. 13A to 13C illustrate a device, such as a small delivery robot vehicle (for example, a scooter-like arrangement employing a single scanning headlight). The system may choose (a) to alternatively power its dual laser sources selectively, in synchrony with the mirrors extreme positions, to focus the spot light on the road ahead ("look-ahead") when moving at high speed, and creating an ample range of illumination for its robot vision system as illustrated in FIG. 13A, or alternatively, (b) when approaching an intersection check for traffic ("V") coming from the right as illustrated in FIG. 13B, and/or alternatively, (c) check for oncoming traffic before making a left or right turn ("look-aside") as illustrated in FIG. 13C.

FIGS. 14A to 14C illustrate an embodiment of a vehicle with dual head light assemblies. In the case of scanning head lights these "look-aside" (FIG. 14A) or "look-ahead" (FIGS. 14B and 14C) options may be automatically selected by, for example, an ADAS (Advanced Driver-Assistance System) vision system. One advantage of having the option to strongly illuminate side views is that it enables very short exposure/illumination strobes, limiting or minimizing motion blur in the side view cameras images and enabling a greater accuracy in motion estimation, which is useful for collision avoidance. Even when the vehicle is not slowing down or stopped at an intersection, but moving at great speed, such sideways directed short but powerful illumination strobes help mitigate the motion blur that would otherwise occur in images produced by sideways looking cameras as part of a collision avoidance system due to the optical flow in such sideways looking cameras (i.e., the motion blur caused by the vehicle's ego-motion). For example, removing this ego motion blur from the edges of objects illuminated by the short but powerful strobes may greatly help to accurately detect, for example, the heading, velocity, and acceleration of a pedestrian on path adjacent to the vehicle.

Similarly, the long natural dwell times for the beams in the center forward position enable ample illumination of these center of FoV positions, thus these head lights will reach farther ahead with forward looking ADAS cameras, all while complying with eye safety requirements. Moreover, when the forward directed beam is narrow enough to illuminate just a "slice" (subfield) of the FoV at the time, then columns or fields of pixels may be turned on and off selectively (e.g. by a rolling shutter synchronized with the beam "slice" scrolling location). In FIG. 14A, a self-driving vehicle is checking for cross traffic prior to crossing an intersection. In FIG. 14B, a vehicle's dual flashing head lights slightly converge and illuminate its planned trajectory in its own lane immediately ahead.

As illustrated in FIG. 14C, the vehicle can benefit in creating a "cross fire" of illumination, which in the case of a dense fog with carefully synchronized left and right alternating flashes may mitigate the blinding of the forward left and right side cameras due to backscatter from the illumination sources. This back scatter may be particularly strong in the direction of the beam itself as small water droplets in thick fog and rain tend to a retro-reflect the beam's light. (Retro-reflection is also known as "cat eye" reflection.) The left light is synchronized with the right camera frame exposure and visa-versa. In FIG. 14C, the left head light transmits (T) its strobe of light. Due to the retro-reflective back reflection of fog water droplets, the left camera may be blinded by the strong near field reflections in a ground fog. However, some of the light transmitted by the left head light (T) will reach the object in fog and the receiver camera (R) on the right side will be able to see the object, because at that moment the right side illuminator is off and thus it is not blinded by backscattered light. By alternating the left light/right camera and right light/left camera with enough light the object in the fog can be detected. This is an example of synchronous cross-field alternating cross-fire stereo fog lights.

It will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system to scan a field of view with light beams, the system comprising:
   a first scanning mirror arrangement and a second scanning mirror arrangement, wherein each scanning mirror arrangement comprises a mirror and a drive mechanism configured to rotate the mirror about an axis between two terminal positions that are separated by 10 or more degrees, and wherein each scanning mirror arrangement is adapted for attachment at separate sites at opposite sides of a vehicle;
   one or more light sources configured to simultaneously produce at least a first light beam and a second light beam separately directed at each mirror of each scanning mirror arrangement, wherein a direction of the first light beam toward each mirror differs from a direction of the second light beam toward each mirror by at least 5 degrees, wherein the first and the second light beams, upon rotation of each mirror, are configured to separately scan a combined field of view (FOV) of at least 20 degrees for each scanning mirror arrangement; and
   wherein each scanning mirror arrangement provides for pivoting to a first location for separately scanning the combined FOV at a side view away from each side of the vehicle, and pivoting to a second location for separately scanning the combined FOV at an overlapping front view ahead of a front side of the vehicle.

2. The system of claim 1, wherein the scanning mirror arrangement is configured to have a center position midway between the two terminal positions, wherein the first light beam and the second light beam, with the mirror at the center position, are directed toward the mirror from opposite sides of a center axis extending perpendicular to a reflecting surface of the mirror.

3. The system of claim 1, wherein the one or more light sources are configured to further simultaneously produce a third light beam, wherein a direction of the third light beam toward the mirror differs from the directions of both the first light beam and the second light beam by 5 or more degrees.

4. The system of claim 3, wherein the one or more light sources are configured to further simultaneously produce a fourth light beam, wherein a direction of the fourth light beam toward the mirror differs from the directions of each of the first light beam, the second light beam, and the third light beam by 5 or more degrees.

5. The system of claim 1, wherein the one or more light sources are a single light source, wherein the system further comprises a beamsplitting arrangement configured to produce both the first light beam and the second light beam from a beam emitted by the single light source.

6. The system of claim 1, wherein the one or more light sources comprise a first light source configured to produce the first light beam and a second light source configured to produce the second light beam.

7. The system of claim 1, wherein the direction of the first light beam toward the mirror differs from the direction of the second light beam toward the mirror by 10 or more degrees.

8. The system of claim 1, wherein the direction of the first light beam toward the mirror differs from the direction of the second light beam toward the mirror by 20 or more degrees.

9. The system of claim 1, the first and second light beams, upon rotation of the mirror, are configured to scan a field of view of 40 or more degrees.

10. The system of claim 1, further comprising
    one or more memory devices that store instructions; and
    one or more processor devices that execute the stored instructions to perform actions of a method, including:
      directing the one or more light sources to simultaneously illuminate the mirror with the first light beam and the second light beam; and
      rotating the mirror between the two extreme positions to scan the first and second light beams over the field of view.

11. The system of claim 1, wherein the scanning mirror arrangement comprises hinges attached at opposite sides of the mirror, wherein the hinges are disposed between the drive mechanism and the mirror.

12. A system to determine a position of one or more objects, comprising:
    a first scanning mirror arrangement and a second scanning mirror arrangement, wherein each scanning mirror arrangement comprises a mirror and a drive mechanism configured to rotate the mirror about an axis between two terminal positions that are separated by 10 or more degrees, and wherein each scanning mirror arrangement is adapted for attachment at separate sites at opposite sides of a vehicle;

one or more light sources configured to simultaneously produce at least a first light beam and a second light beam separately directed at each mirror of each scanning mirror arrangement, wherein a direction of the first light beam toward each mirror differs from a direction of the second light beam toward each mirror by at least 5 degrees, wherein the first and the second light beams, upon rotation of each mirror, are configured to separately scan a combined field of view (FOV) of at least 20 degrees for each scanning mirror arrangement;

wherein each scanning mirror arrangement provides for pivoting to a first location for separately scanning the combined FOV at a side view away from each side of the vehicle, and pivoting to a second location for separately scanning the combined FOV at an overlapping front view ahead of a front side of the vehicle; and a plurality of receivers that are spaced-apart from each other and the scanning mirror arrangement, each receiver comprising an array of pixels, wherein each of the pixels is configured to detect photons received by the pixel.

13. The system of claim 12, further comprising:
one or more memory devices that store instructions; and
one or more processor devices that execute the stored instructions to perform actions of a method, including:
directing the one or more light sources to simultaneously illuminate the mirror with the first light beam and second light beam; and
rotating the mirror between the two extreme positions to scan the first and second light beams over the field of view.

14. The system of claim 12, further comprising:
one or more memory devices that store instructions; and
one or more processor devices that execute the stored instructions to perform actions of a method, including:
directing the one or more light sources to illuminate the mirror with the first light beam and the second light beam, wherein the first and second light beams reflect from the mirror and each sequentially illuminate a plurality of regions of one or more objects in the field of view;
rotating the mirror between the two extreme positions to scan the first and second light beams over the field of view;
for each of the regions, receiving, from the plurality of receivers, photons of either the first or second light beam reflected or scattered by the region of the one or more objects; and
for each of the regions, determining a position of the regions using the received photons of either the first light beam or the second light beam reflected or scattered by that region.

15. The system of claim 12, wherein the one or more light sources are configured to further simultaneously produce a third light beam, wherein a direction of the third light beam toward the mirror differs from the directions of both the first light beam and the second light beam by 5 or more degrees.

16. The system of claim 15, wherein the one or more light sources are configured to further simultaneously produce a fourth light beam, wherein a direction of the fourth light beam toward the mirror differs from the directions of each of the first light beam, the second light beam, and the third light beam by 5 or more degrees.

17. The system of claim 12, wherein the scanning mirror arrangement comprises hinges attached at opposite sides of the mirror, wherein the hinges are disposed between the drive mechanism and the mirror.

18. The system of claim 12, the first and second light beams, upon rotation of the mirror, are configured to scan a field of view of 40 or more degrees.

19. The system of claim 12, wherein the scanning mirror arrangement is configured to have a center position midway between the two terminal positions, wherein the first light beam and the second light beam, with the mirror at the center position, are directed toward the mirror from opposite sides of a center axis extending perpendicular to a reflecting surface of the mirror.

20. The system of claim 12, wherein the one or more light sources are a single light source, wherein the system further comprises a beamsplitting arrangement configured to produce both the first light beam and the second light beam from a beam emitted by the single light source.

21. The system of claim 12, wherein the one or more light sources comprises a first light source configured to produce the first light beam and a second light source configured to produce the second light beam.

22. A method for scanning a field of view with light beams, the method comprising:
employing a first scanning mirror arrangement and a second scanning mirror arrangement, wherein each scanning mirror arrangement comprises a mirror and a drive mechanism configured to rotate the mirror about an axis between two terminal positions that are separated by 10 or more degrees, and wherein each scanning mirror arrangement is adapted for attachment at separate sites at opposite sides of a vehicle;
employing one or more light sources configured to simultaneously produce at least a first light beam and a second light beam separately directed at each mirror of each scanning mirror arrangement, wherein a direction of the first light beam toward each mirror differs from a direction of the second light beam toward mirror by at least 5 degrees, wherein the first and the second light beams, upon rotation of each mirror, are configured to separately scan a combined field of view (FOV) of at least 20 degrees for each scanning mirror arrangement; and
wherein each scanning mirror arrangement provides for pivoting to a first location for separately scanning the combined FOV at a side view away from each side of the vehicle, and pivoting to a second location for separately scanning the combined FOV at an overlapping front view ahead of a front side of the vehicle.

23. The method of claim 22, wherein the one or more light sources are configured to further simultaneously produce a third light beam, wherein a direction of the third light beam toward the mirror differs from the directions of both the first light beam and the second light beam by 5 or more degrees.

24. The method of claim 23, the at least one light source are configured to further simultaneously produce a fourth light beam, wherein a direction of the fourth light beam toward the mirror differs from the directions of each of the first light beam, the second light beam, and the third light beam by 5 or more degrees.

25. The method of claim 22, wherein the one or more light sources are a single light source, wherein method further comprising using a beamsplitting arrangement to produce both the first light beam and the second light beam from a beam emitted by the single light source.

26. The method of claim 22, wherein the one or more light sources comprise a first light source configured to produce the first light beam and a second light source configured to produce the second light beam.

27. The method of claim 22, wherein rotating the mirror comprises rotating the mirror between the two extreme positions to scan the first and second light beams over a combined field of view of 40 or more degrees.

* * * * *